(12) United States Patent
Clough

(10) Patent No.: US 8,395,503 B2
(45) Date of Patent: Mar. 12, 2013

(54) AUTOMATIC DOOR

(75) Inventor: Bradford A. Clough, Largo, FL (US)

(73) Assignee: Altorr Corporation, Largo, FL (US)

( * ) Notice: Subject to any disclaimer, the term of this patent is extended or adjusted under 35 U.S.C. 154(b) by 101 days.

(21) Appl. No.: 12/888,438

(22) Filed: Sep. 23, 2010

(65) Prior Publication Data

US 2012/0075091 A1  Mar. 29, 2012

(51) Int. Cl.
*G08B 13/08* (2006.01)
(52) U.S. Cl. ................... 340/545.1; 340/541
(58) Field of Classification Search ........... 340/545.1, 340/541
See application file for complete search history.

(56) References Cited

U.S. PATENT DOCUMENTS

| 5,247,763 | A | 9/1993 | Hein |
| 5,634,298 | A * | 6/1997 | Slopack .................. 49/360 |
| 7,187,282 | B2 * | 3/2007 | Fergusson ................ 340/567 |
| 2003/0182759 | A1 | 10/2003 | Breed et al. |
| 2003/0188489 | A1 | 10/2003 | Shoemaker |
| 2005/0091928 | A1 | 5/2005 | Okulov et al. |
| 2006/0187034 | A1 * | 8/2006 | Styers et al. ............ 340/545.1 |
| 2009/0139141 | A1 | 6/2009 | MacLeod et al. |

* cited by examiner

*Primary Examiner* — Travis Hunnings
(74) *Attorney, Agent, or Firm* — Michael G. Smith, Esq.

(57) ABSTRACT

In some implementations a storage device having a voice-recognition engine stored thereon is coupled to a microcontroller, a device-controller for an automatic door is operably coupled to the microcontroller.

20 Claims, 34 Drawing Sheets

VOICE DATA RECEIVER
504

AUTOMATIC DOOR
CONTROLLER

MICROPHONE CIRCUIT
2004

PRIOR ART
SPEAKER CIRCUIT
2014

AUTOMATIC DOOR

BACKGROUND

1. Field of Invention

This disclosure relates generally to door openers, and more particularly to electrically actuated door opening and closing devices.

2. Description of Related Art

People with physical mobility difficulties often rely on external means to open and close doors. Those external means include physical assistance of another person, an animal to open and close doors, and/or electrically and/or hydraulically actuated automatic doors that physically move and transport a door.

Conventional control of the electrically and/or hydraulically actuated automatic doors has been very limited. The conventional control devices of the automatic doors have been limited to tactile devices that include buttons to direct movement of the automatic door. The tactile control devices require a certain amount of physical dexterity that a particular person may or may not have. At best, the tactile control devices are inconvenient to use for some people, and under the worse situations, the tactile control devices are impossible to use for other people.

Conventional control of electrically and/or hydraulically actuated doors is also quite efficient in having a linear, prompt and unequivocal response to sensory input that means 'open' or 'close'.

DETAILED DESCRIPTION

The shortcomings, disadvantages and problems in the Description of Related Art are addressed herein, which will be understood by reading and studying the following specification.

Apparatus, systems, and methods of varying scope are described herein. Further aspects and advantages will become apparent by reference to the drawings and by reading the detailed description that follows. In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into five sections. In the first section, a system level overview is described. In the second section, apparatus of implementations are described. In the third section, implementations of methods are described. In the fourth section, a hardware and the operating environment in conjunction with which implementations may be practiced are described. Finally, in the fifth section, a conclusion of the detailed description is provided.

System Level Overview

Figure 1:
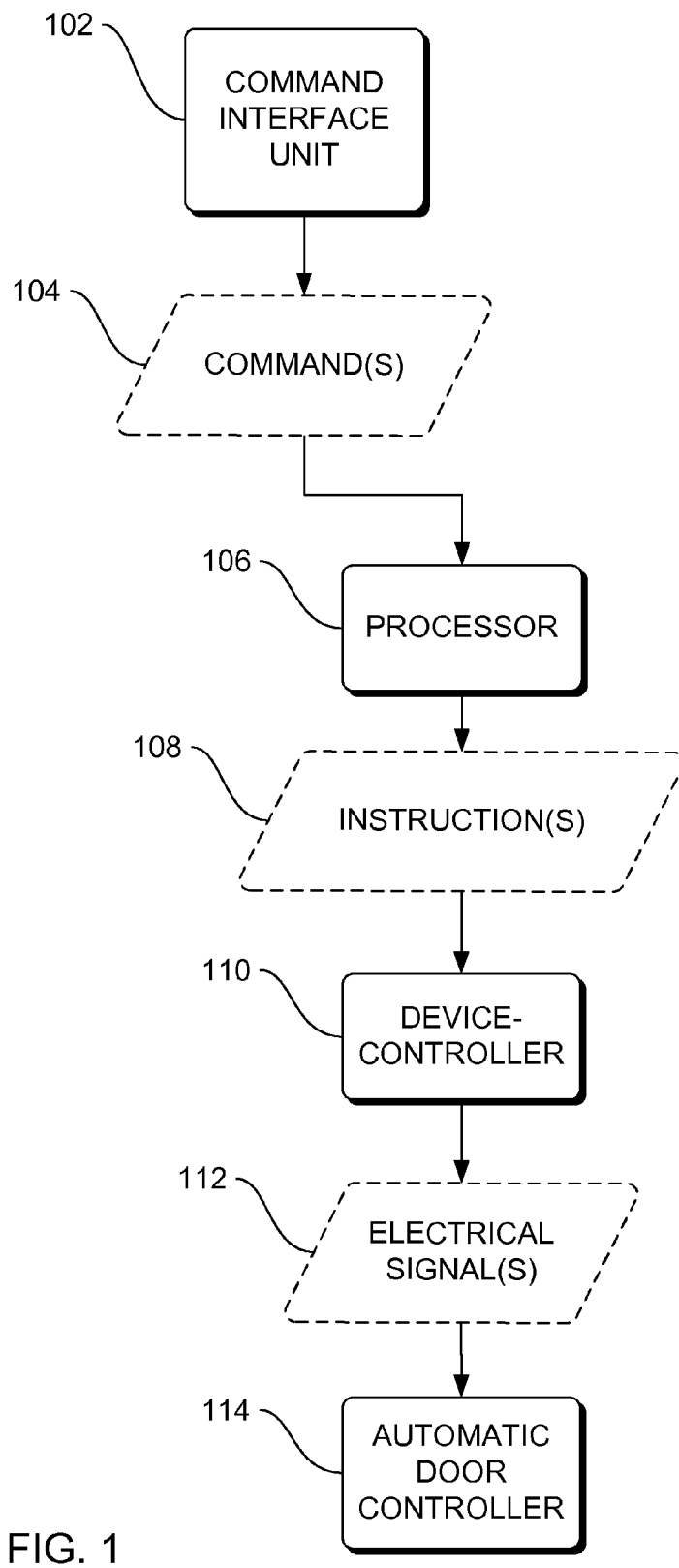
FIG. 1 is a block diagram of an overview of a system to control an automatic door, according to an implementation.

FIG. 1 is a block diagram of an overview of a system 100 to control an automatic door, according to an implementation. System 100 provides a convenient means to control an electrically or hydraulically-controlled automatic door.

System 100 includes a command interface unit 102 that receives information in any one of a number of different communication methods from a human and transmits audio command(s) 104 to a processor 106. Examples of commands 104 include "lock" "unlock" "close" "open" "activate" and "help". One implementation of a number of different interface apparatus for the command interface unit 102 are described in FIG. 3 and another implementation of a number of different interface apparatus for the command interface unit 102 are described in FIG. 4.

The processor 106 in system 100 receives the command(s) 104 and generates one or more instruction(s) 108 that are specifically tailored for a device-controller 110 that accomplishes the command.

The device-controller 110 receives the instruction(s) 108 and generates one or more electric signal(s) 112 that are specifically tailored for an automatic door controller 114 that accomplishes the one or more instruction(s) 108. The device-controller 110 transmits the electrical signal(s) 112 to the automatic door 114. When the automatic door operates in accordance with the electrical signal(s) 112 from the device-controller 110, the automatic door controller 114 performs the command(s) 104 from the command interface unit 102. The automatic door controller 114 controls an automatic electric sliding door 3200 in FIG. 32 or an automatic electric swing door 3300 in FIG. 33.

The system level overview of the operation of an implementation is described in this section of the detailed description.

While the system 100 is not limited to any particular command interface unit 102, command(s) 104, processor 106, instruction(s) 108, device-controller 110, electric signal(s) 112, and automatic door 114, for sake of clarity a simplified command interface unit 102, command(s) 104, processor 106, instruction(s) 108, device-controller 110, electric signal(s) 112, and automatic door controller 114 are described.

Apparatus Implementations

In the previous section, a system level overview of the operation of an implementation was described. In this section, the particular apparatus of such an implementation are described by reference to a series of diagrams.

Figure 2:
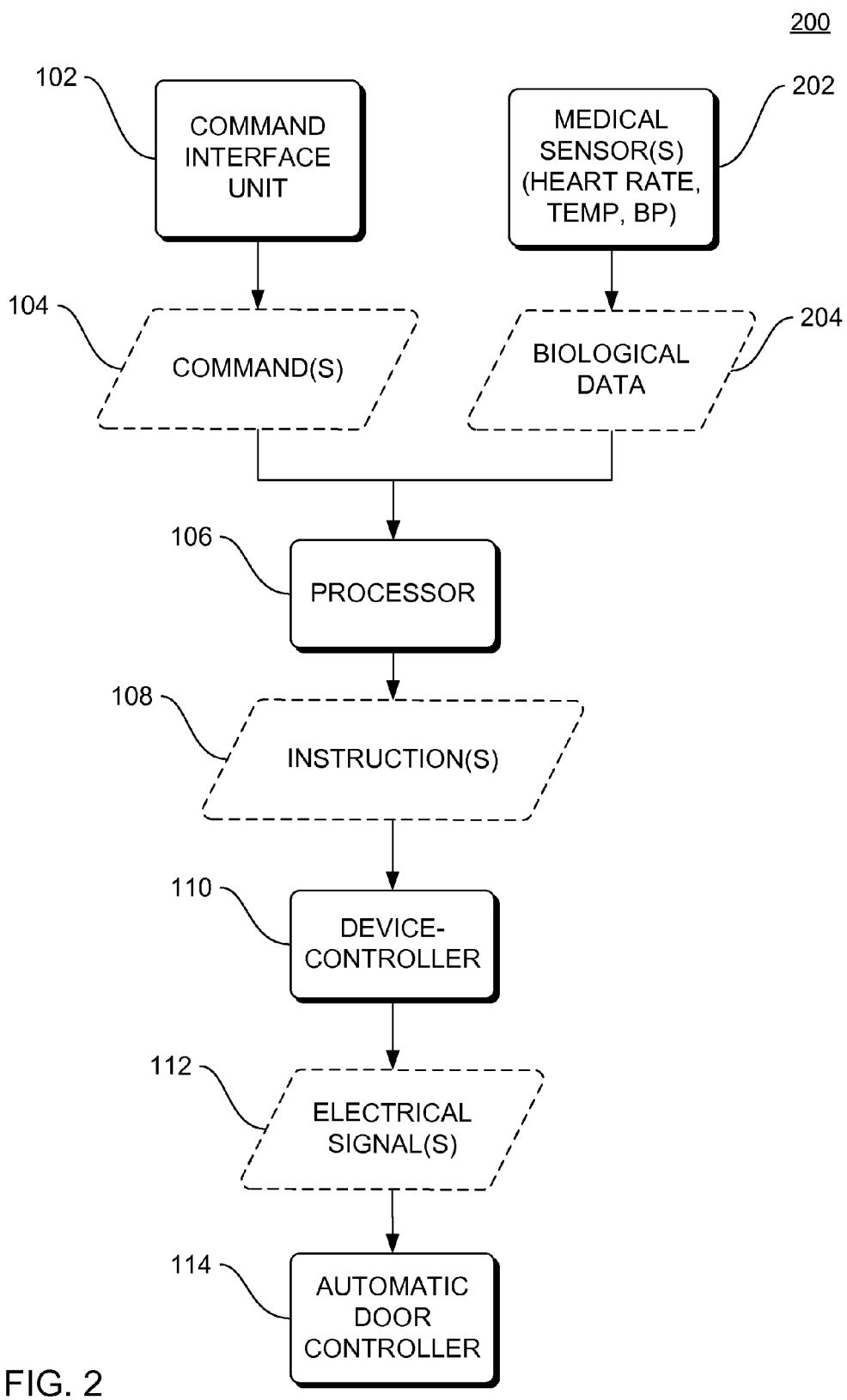
FIG. 2 is a block diagram of apparatus to control an automatic door in reference to the biological condition of a person, according to an implementation.

FIG. 2 is a block diagram of apparatus 200 to control an automatic door in reference to the biological condition of a person, according to an implementation. Apparatus 200 provides a convenient means to control and electrically-controlled automatic door in reference to person healthcare condition.

Apparatus 200 includes one or more sensor(s) 202 of a person's biological condition. Examples of the sensor(s) 202 include heart rate sensor temperature sensor and blood pressure sensor. In apparatus 200, biological sensor data 204 from the person healthcare sensor(s) 202 are received by the processor 106. The instruction(s) 108 that are generated by the processor from the command(s) 104 of the command interface unit 102 are generated in reference to the person healthcare data 204. Thus apparatus 200 generates instruction(s) 108 that ultimately control the automatic door controller 114 in any manner that is less detrimental to the person in consideration of the biological sensor data as indicated by the biological sensor data 204.

Figure 3:
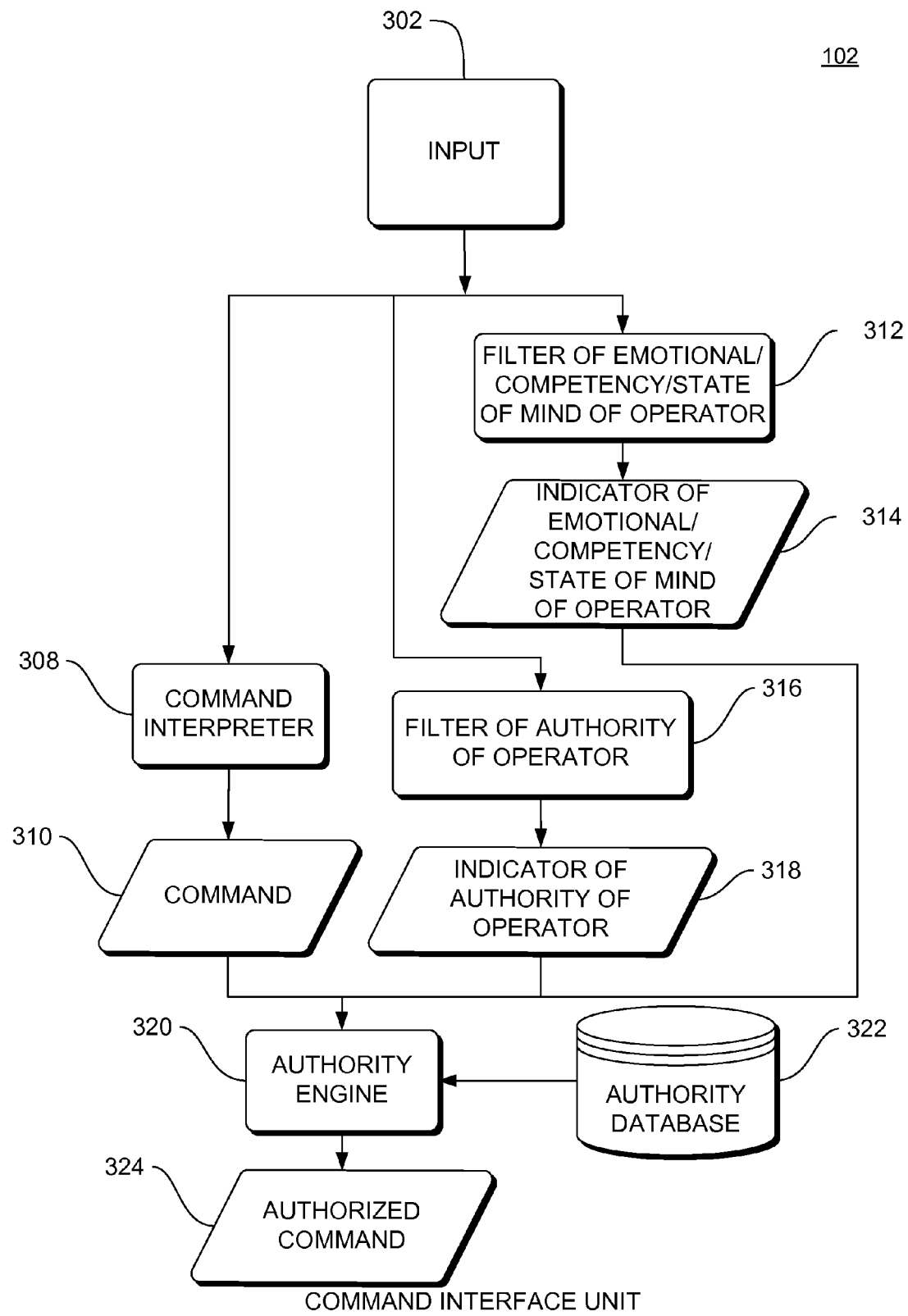
FIG. 3 is a block diagram of a command interface unit apparatus that according to an implementation receives information from a human and generates command(s) from the human information, in reference to authority of the human and the state of the mind of the human.

FIG. 3 is a block diagram of a command interface unit apparatus 300 that according to an implementation receives information from a human and generates command(s) 104 from the human information, in reference to authority of the human and the state of the mind of the human. Apparatus 300 provides command(s) 104 that are suitable to be processed by a processor in control of an automatic door that are generated in reference to the authority in the state of mind of the human. Apparatus 300 is one implementation of the command interface unit 102 and FIG. 1 and FIG. 2.

The command interface unit 102 shown in FIG. 3 includes an input device 302 that receives information in any one of a number of different communication methods. One implementation of a number of different input devices 302 is described in FIG. 5. The received information is processed in a three-pronged approach. In a first prong, the information is processed by a command interpreter 308. The command interpreter analyzes the information and extracts a command 310 from the information. Examples of commands 310 include "lock" "unlock" "close" "open" "activate" and "help". In a second prong, the information is processed by a state-of-mind filter 312. The state-of-mind filter 312 analyzes the information and extracts from the information indicators of the emotional state of the operator, indicators of the competency of the operator, and/or indicators of the state-of-mind of the operator 314. In a third prong, the information is processed by an authority filter 316. The authority filter 316 analyzes the information and extracts from the information an indicator 318 of the authority of the operator.

An authority engine 312 receives the command 310, the state-of-mind 314 and the indicator of authority of the operator 318. The authority engine 320 and analyzes the command 310, the state-of-mind 314 and the indicator of authority of the operator 318 in reference to an authority database 322. In one implementation the authority engine determines whether or not the command 310 is authorized by the authority of the operator 318. If the command 310 is not authorized by the authority of the operator 318, the command 310 is rejected. In another implementation the authority engine 320 determines whether or not the state-of-mind 314 of the operator is of a sufficient level for the command 310. If the state-of-mind 314 for the operator is not of a sufficient level for the command 310, command 310 is rejected.

If the authority engine 320 determines that both the state-of-mind 314 and the authority 318 of the operator are sufficient for the command 310, the authority engine generates or designates an authorized command 324 from the command 310.

Figure 4:
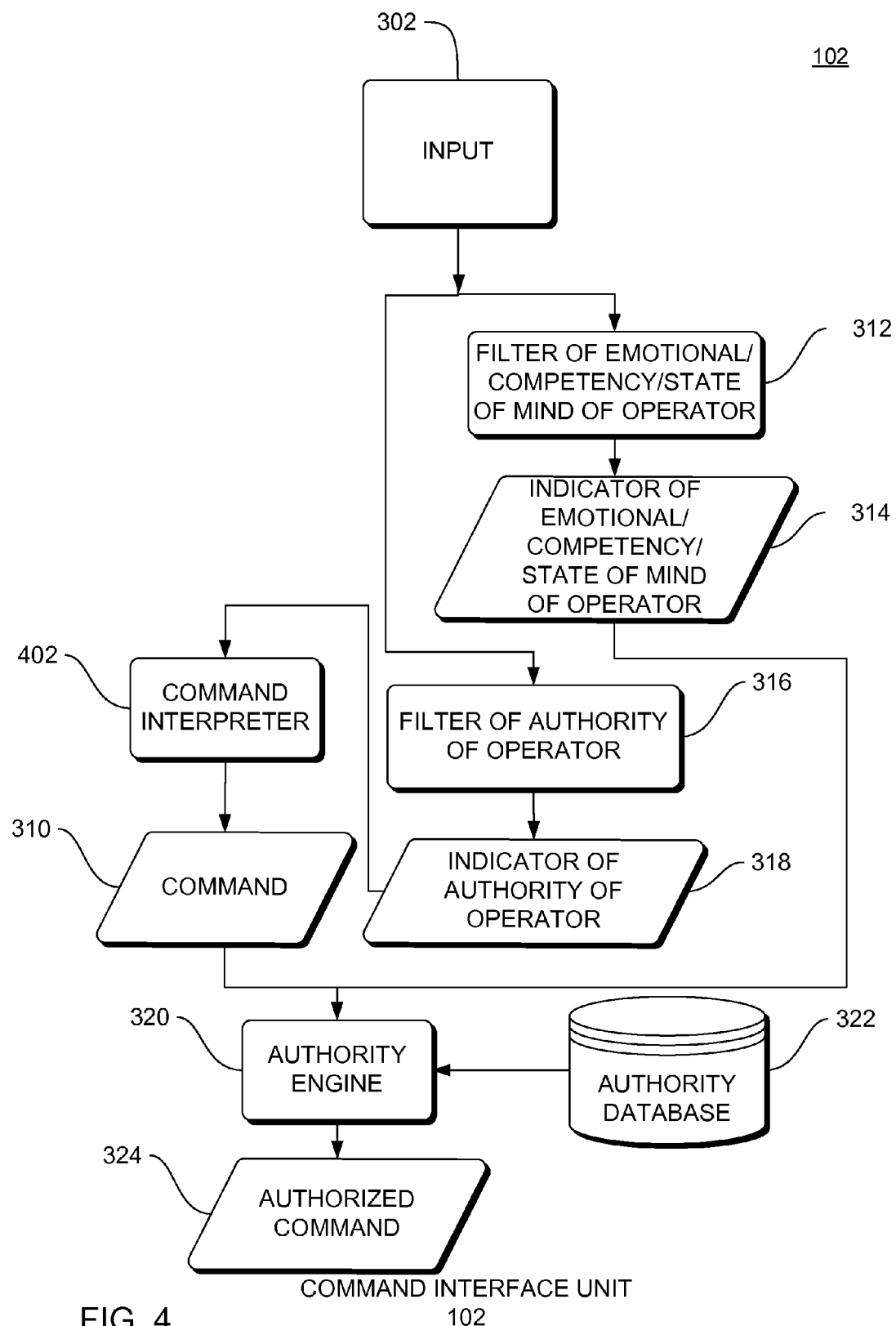
FIG. 4 is a block diagram of a command interface unit apparatus that according to an implementation receives information from a human and generates command(s) from the human information, in reference to authority of the human and the state of the mind of the human.

FIG. 4 is a block diagram of a command interface unit apparatus 400 that according to an implementation receives information from a human and generates command(s) 104 from the human information, in reference to authority of the human and the state of the mind of the human. Apparatus 400 provides command(s) 104 that are suitable to be processed by a processor in control of an automatic door that are generated in reference to the authority in the state of mind of the human. Apparatus 400 is one implementation of the command interface unit 102 and FIG. 1 and FIG. 2.

The command interface unit 102 shown in FIG. 4 includes an input device 402 that receives information in any one of a number of different communication methods. One implementation of a number of different input devices 402 is described in FIG. 5. The received information is processed in a two-pronged approach. In a first prong, the information is processed by an authority filter 316. The authority filter 316 analyzes the information and extracts from the information an indicator 318 of the authority of the operator. Thereafter, the information is processed by a command interpreter 402. The command interpreter analyzes the information and extracts a command 310 from the information. Examples of commands 310 include "lock" "unlock" "close" "open" "activate" and "help". In a second prong, the information is processed by a state-of-mind filter 312. The state-of-mind filter 312 analyzes the information and extracts from the information indicators of the emotional state of the operator, indicators of the competency of the operator, and/or indicators of the state-of-mind of the operator 314.

An authority engine 312 receives the command 310, the state-of-mind 314 and the indicator of authority of the operator 318. The authority engine 320 and analyzes the command 310, the state-of-mind 314 and the indicator of authority of the operator 318 in reference to an authority database 322. In one implementation the authority engine determines whether or not the command 310 is authorized by the authority of the operator 318. If the command 310 is not authorized by the authority of the operator 318, the command 310 is rejected. In another implementation the authority engine 320 determines whether or not the state-of-mind 314 of the operator is of a sufficient level for the command 310. If the authority for the operator is not of a sufficient level for the command 310, command 310 is rejected. If the authority for the operator is of a sufficient level for the command 310, command 310 is accepted.

Figure 5:
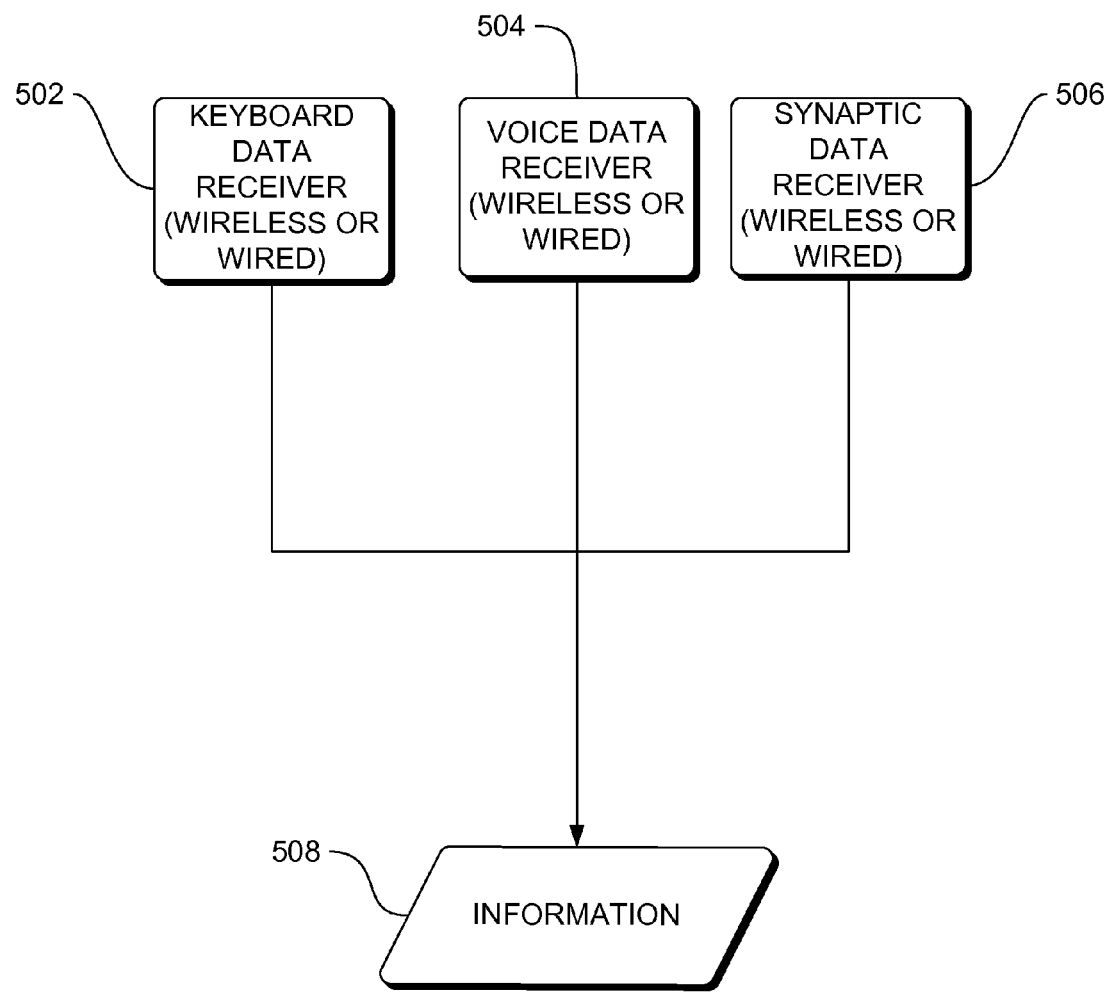
FIG. 5 is a block diagram of a plurality of input devices that receive information in any one of a number of different communication methods, according to an implementation.

FIG. 5 is a block diagram of a plurality of input devices 500 that receive information in any one of a number of different communication methods, according to an implementation. Input devices 500 are implementations of the input devices 302 and FIG. 3 and FIG. 4.

Input devices 302 include a conventional keyboard data receiver 502, commonly known as a keyboard. In some implementations the keyboard includes alphanumeric keys for entering alphanumeric data. Input devices 302 also include an audio data receiver 504. Input devices also include a synaptic data receiver 506. The receivers 502, 504 and 506 can be implemented either with a wireless connection to the command interface unit 102 and/or with a wired connection to the command interface unit 102. The receivers 502, 504 and 506 capture information 508 from an operator that is processed by the command interface unit 102 in FIG. 1, FIG. 2 and/or FIG. 3.

A receiver that is not shown in FIG. 5 is a pressure sensitive device (piezo electric device) mounted on and/or in the top of a tooth, that detects/senses pressure and transmits the pressure reading via a wireless connection (e.g. a Bluetooth communication link, or Zigbee communication link) to a processor. The pressure reading/measurement and/or time duration of the pressure reading/measurement is interpreted as an indicator or command to an external device, such as an indicator of a speed and/or direction of a lift device. Specifications for the Bluetooth communication link are published by the Bluetooth Special Interest Group located at 500 108th Avenue NE, Suite 250, Bellevue, Wash. 98004 Phone Number: +1.425.691.3535. Specifications for the ZigBee communication link are published by the ZigBee Alliance located at 2400 Camino Ramon, Suite 375, San Ramon, Calif. 94583. Some implementations the wireless tooth device tooth also detects/senses audio vibrations and transmits representations of the audio vibrations via the wireless connection to the processor. The representations of the audio vibrations are interpreted as an indicator or command to an external device, such as an indicator of a speed, amplitude or throttle (variation of power output) and/or direction of a lift device. The audio vibrations include vibrations transmitted through the solid matter of the tooth and the jaw bone and/or audio vibrations transmitted through the air and the mouth surrounding the audio receiver. Various implementation of the device mounted on a tooth include audio microphone, temperature monitor, saliva acidity sensor, pulse monitor sensor, voice vibration sensor (to sense jawbone vibrations), and with bit control for throttling of the speed of the actuated-door.

Figure 6:
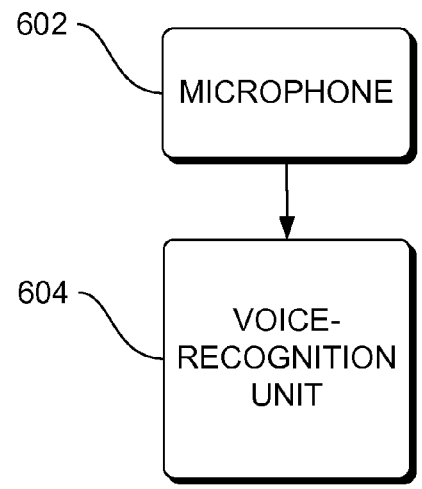
FIG. 6 is a block diagram of a voice data receiver that receives audio information, according to an implementation.
Figure 26:
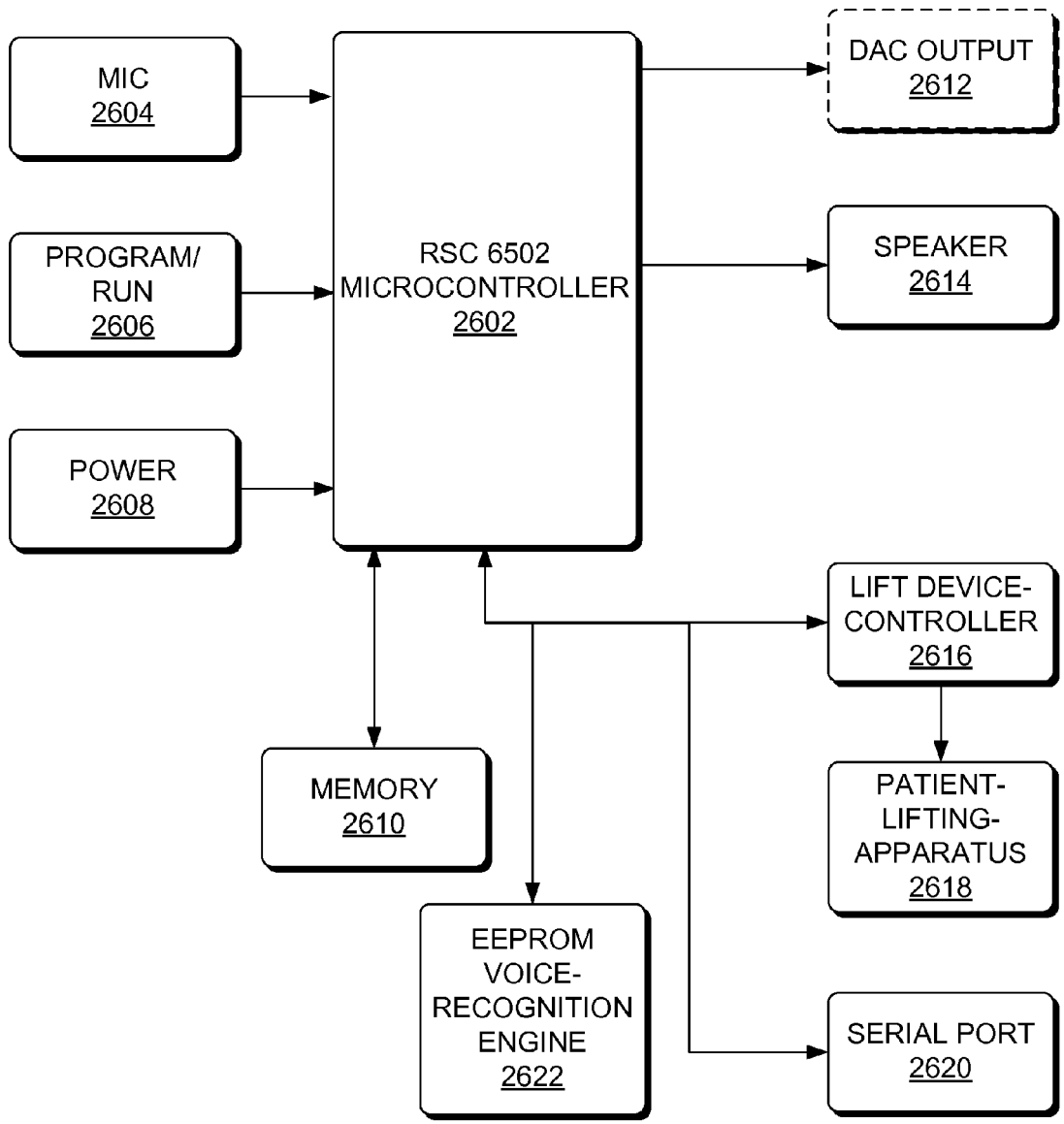
FIG. 26 is a block diagram of a voice-recognition unit for an actuated-door, according to an implementation.
Figure 29:
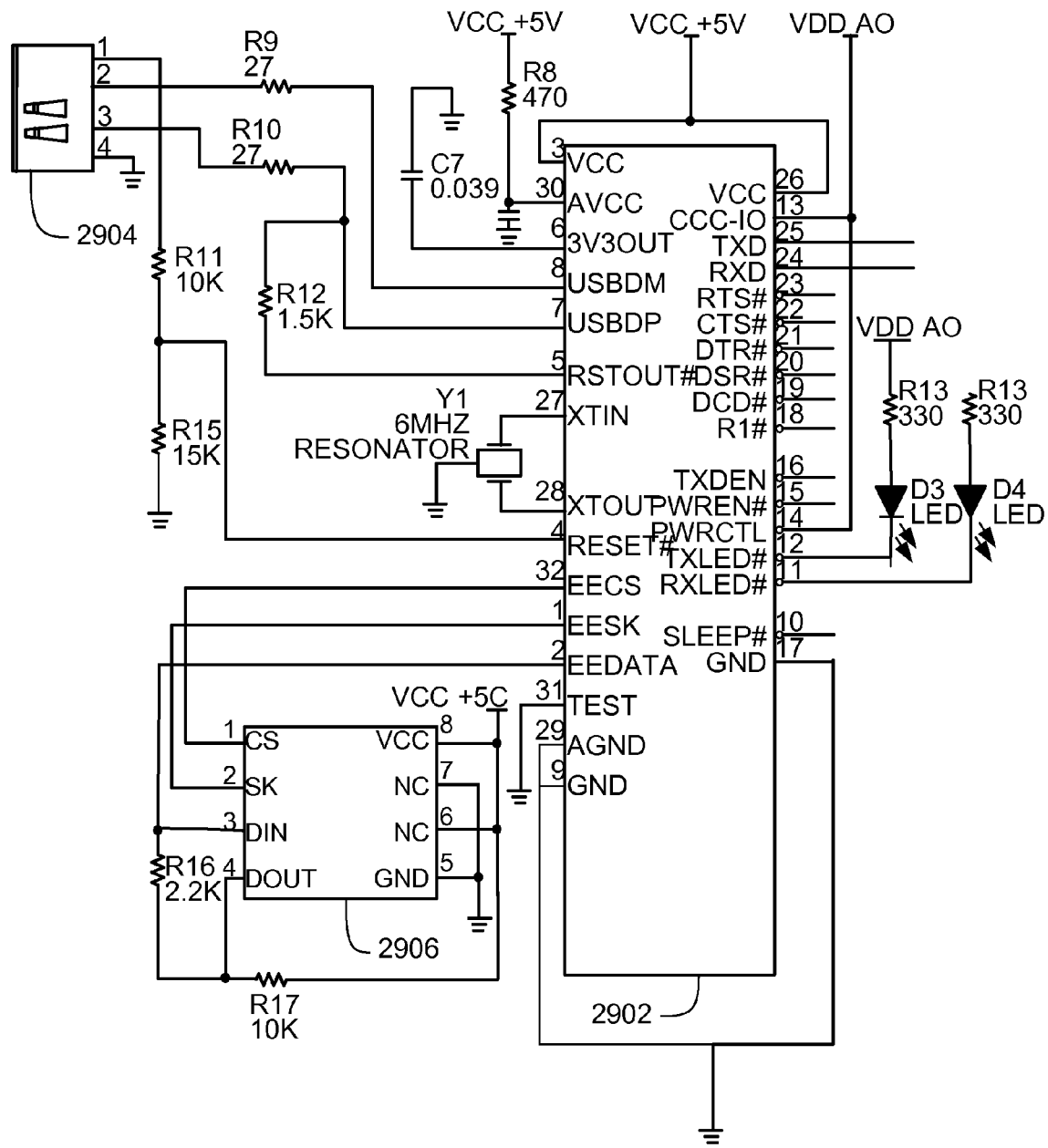
FIG. 29 is an electrical schematic diagram of a voice-recognition apparatus to control an actuated-door, according to an implementation.

FIG. 6 is a block diagram of a voice data receiver 600 that receives audio information, according to an implementation. Voice data receiver 504 in FIG. 6 is one implementation of the voice data receiver 504 in FIG. 5. The voice data receiver 504 in FIG. 6 includes a microphone 602 that is operably coupled to a voice-recognition unit 604. In some implementations, the voice-recognition unit 604 includes a component (not shown) that suppresses or filters background environmental noise. Voice-recognition apparatus 2600 in FIG. 26 shows an implementation of voice-recognition unit 604. Voice-recognition apparatus 2900 in FIG. 29 shows an implementation of voice-recognition unit 604.

In some implementations the microphone 602 is located in close proximity to the mouth of the speaker in order to obtain clear audio data from the speaker. For example in some further implementations, the microphone 602 is located on a Bluetooth enabled earpiece. In other implementations, the microphone 602 is mounted on the end of a stalk of a headset. In other implementations, the microphone is mounted on a lapel clip.

Figure 7:
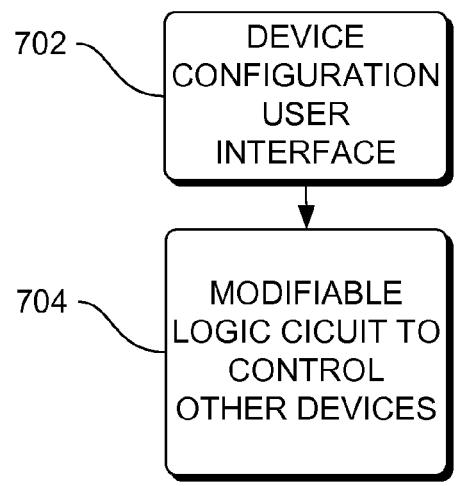
FIG. 7 is a block diagram of an automatic door controller that receives instructions and generates electrical signals that control an automatic door, according to an implementation.

FIG. 7 is a block diagram of an automatic door controller 700 that receives instructions and generates electrical signals that control an automatic door, according to an implementation. Lift controller 700 is one example of system 100 in FIG. 1 and apparatus 200 in FIG. 2. The automatic door controller 700 includes a user interface 702 for device configuration that is operable to display, receive and/or store device configuration information for an automatic door, such as lift 112 in FIG. 1 and FIG. 2. The device configuration user interface 702 is operably coupled to a modifiable logic circuit 704 that is operable to control the lift.

In one implementation, the modifiable logic circuit 704 is a field-programmable gate-array (FPGA) circuit in reference to the device configuration. In the FPGA implementation, the FPGA circuit is operable to receive digital audio input, and extract a command (e.g. command 104 in FIG. 1) that is relevant to an automatic door (e.g. automatic door controller 114 in FIG. 1) and the automatic door controller 700 includes a transmitter that is operable to send the command to an automatic door-controller (e.g. 110 in FIG. 1).

Figure 8:
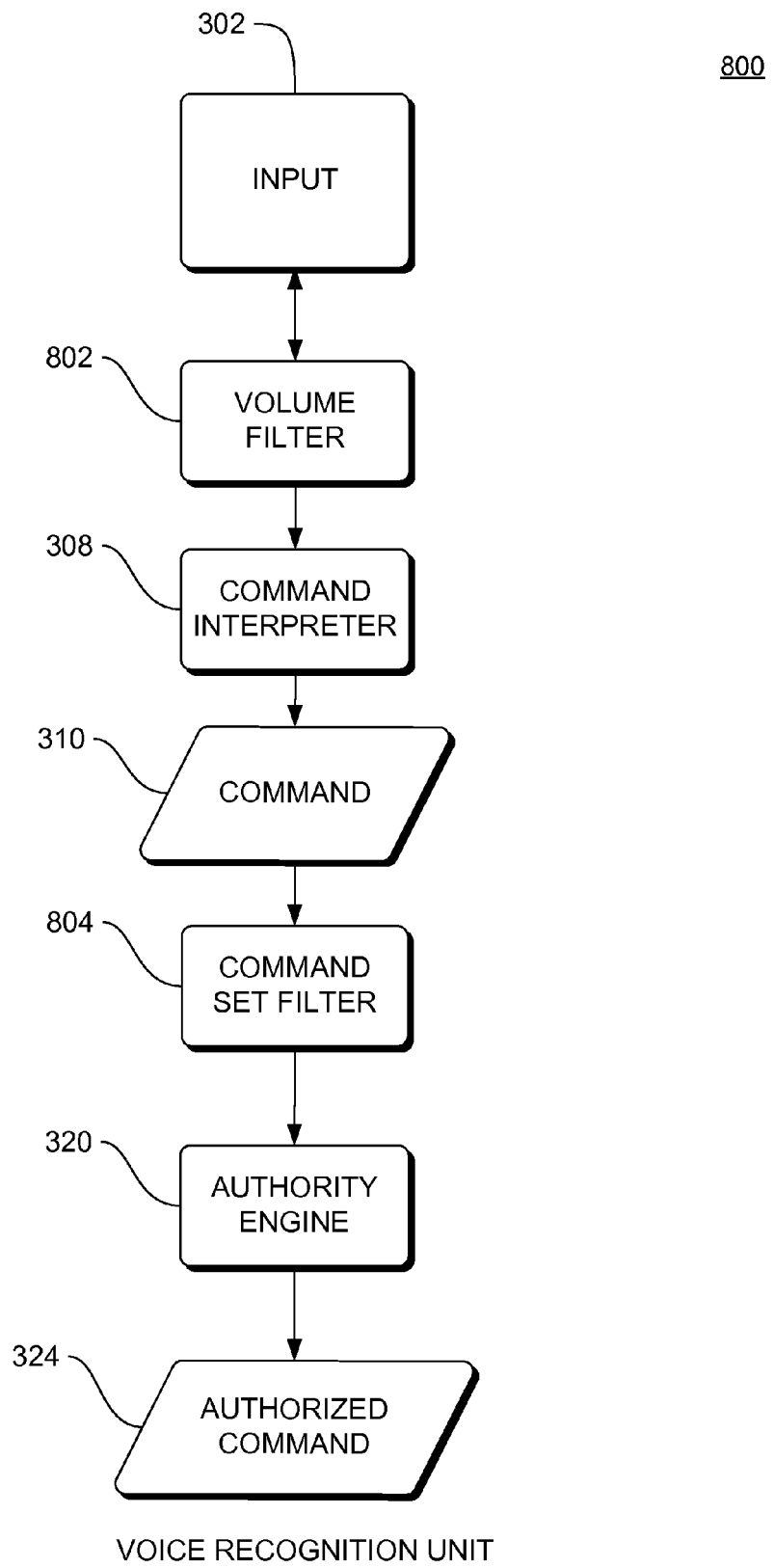
FIG. 8 is a block diagram of a voice-recognition unit that receives audio information and generates commands that control an automatic door, according to an implementation.

FIG. 8 is a block diagram of a voice-recognition unit 800 that receives audio information and generates commands that control an automatic door, according to an implementation. Voice-recognition unit 800 includes an input device 302 that receives information in any one of a number of different communication methods. Examples of communication methods include audio and/or synaptic communication.

Figure 11:
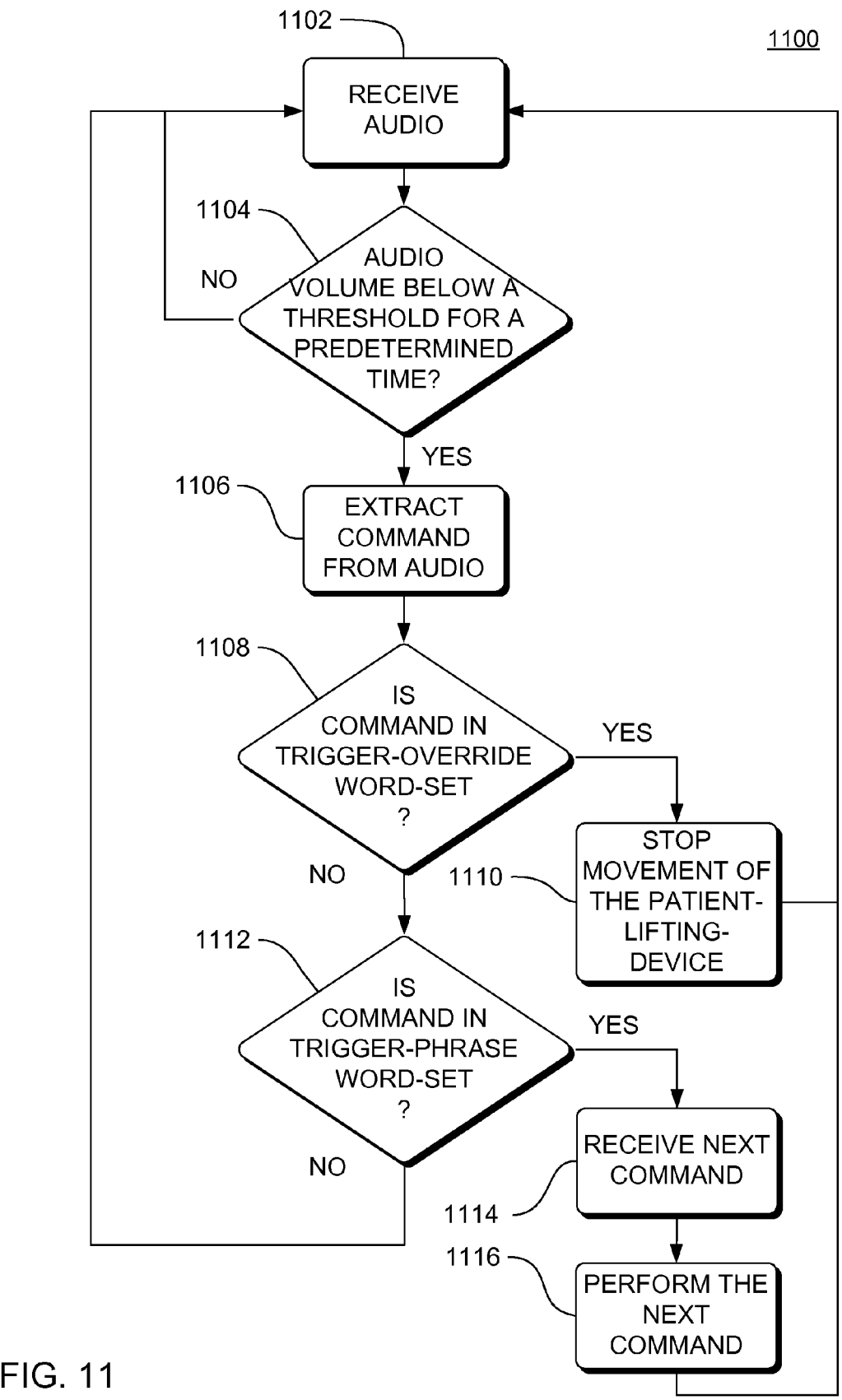
FIG. 11 is a flowchart of a method to control an automatic door, according to an implementation involving trigger words.
Figure 12:
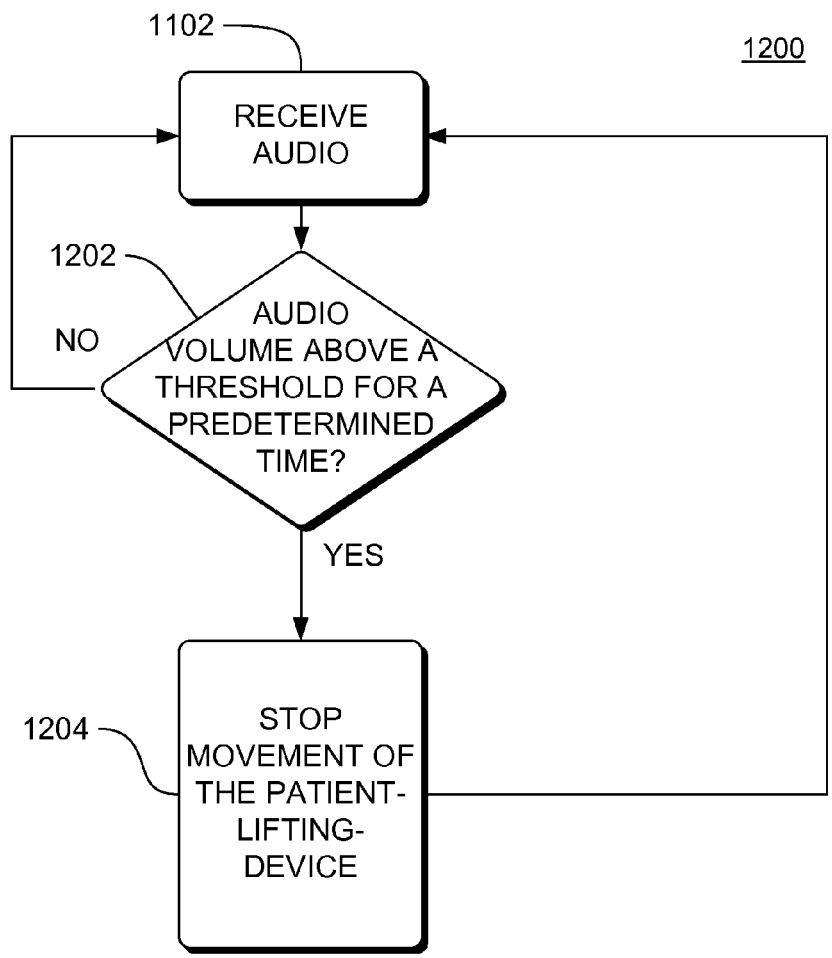
FIG. 12 is a flowchart of a method to control an automatic door, according to an implementation involving trigger override command set words.

Voice-recognition unit 800 also includes a volume filter 802 that performs action 1104 in FIG. 11 and/or action 1204 in FIG. 12 on the information received from the input device 302.

The information received from the input device is processed by a command interpreter 308. The command interpreter analyzes the information and extracts a command 310 from the information.

Some implementations of voice-recognition unit 800 includes a command set filter 804 that includes one or more filters of the command set. For example, in some implementations, the command set filter 804 includes the authority filter 316 of FIG. 3. Some implementations of the command set filter 804 also include the state-of-mind filter 312 of FIG. 3. The implementations of apparatus 80 that include the command set filter 804 also include an authority engine 320 as described in FIG. 3. The authority engine 320 generates an authorized command 324.

Method Implementations

In the previous section, apparatus of the operation of an implementation was described. In this section, the particular methods performed by a processor of such an implementation are described by reference to a series of flowcharts.

Figure 31:
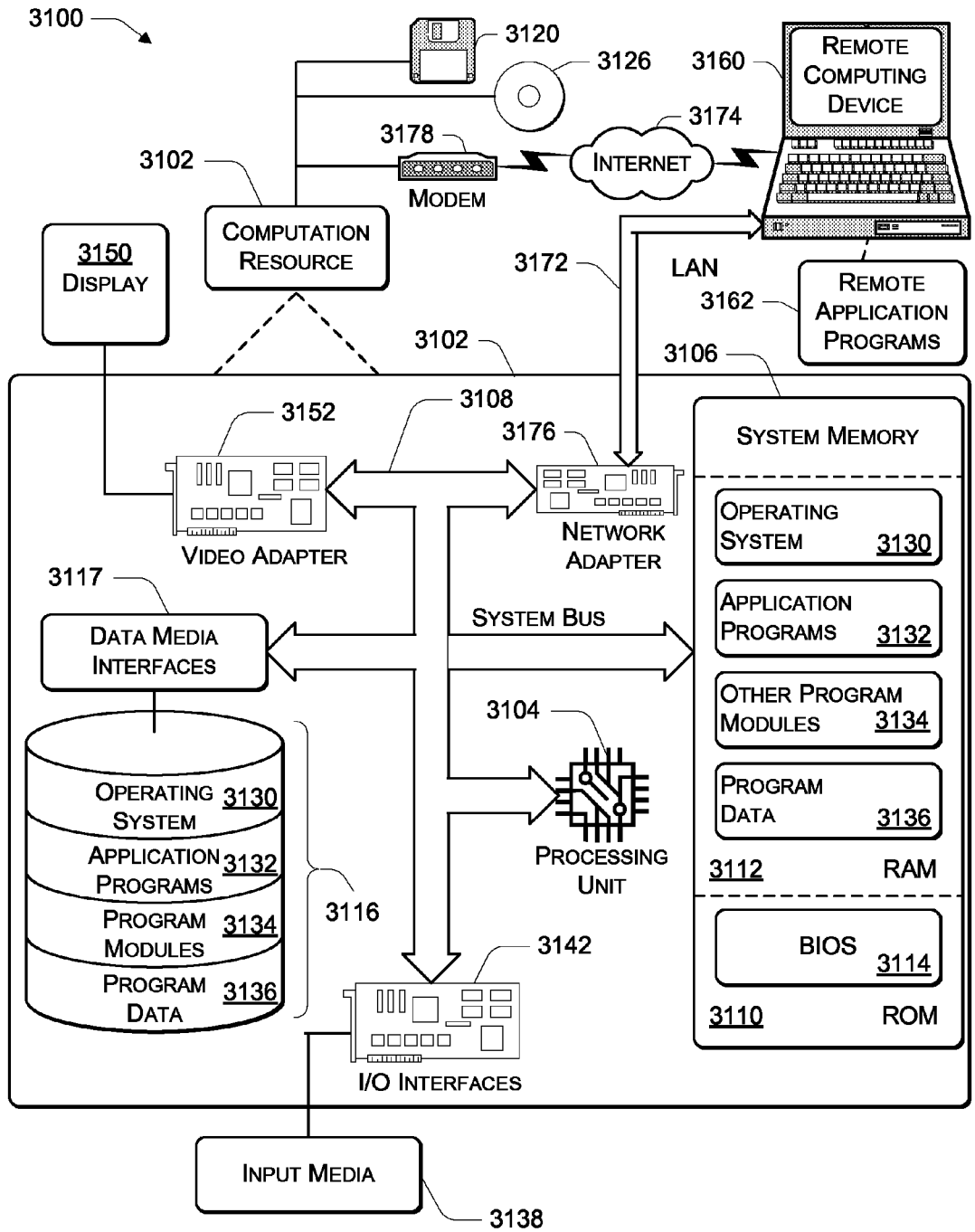
FIG. 31 is a block diagram of a computer environment that controls automatic doors from audio voice commands, in accordance with an implementation.

In some implementations, methods 900-1800 are implemented as a sequence of instructions which, when executed by a processor, such as processor unit 3104 in FIG. 31, microcontroller 2602 in FIG. 26 or processor 106 in FIG. 1 and FIG. 2, cause the processor to perform the respective method. In other implementations, methods 900-1800 are implemented as a computer-accessible or a computer-usable medium having executable instructions capable of directing a processor, such as processor unit 3104 in FIG. 31, to perform the respective method. In varying implementations, the medium is a magnetic medium, an electronic medium, or an optical medium.

Figure 9:
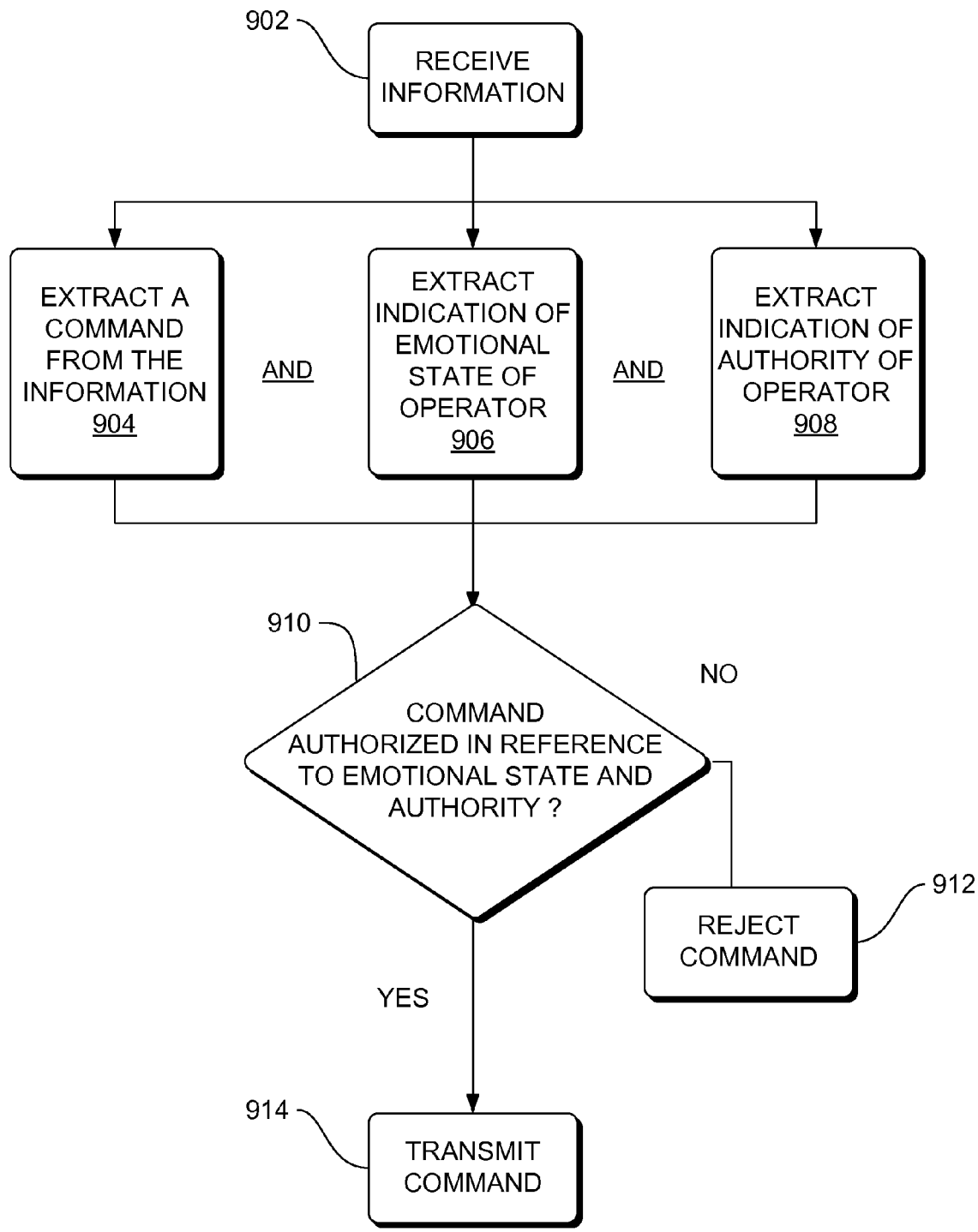
FIG. 9 is a flowchart of a method to control an automatic door, according to an implementation.
Figure 10:
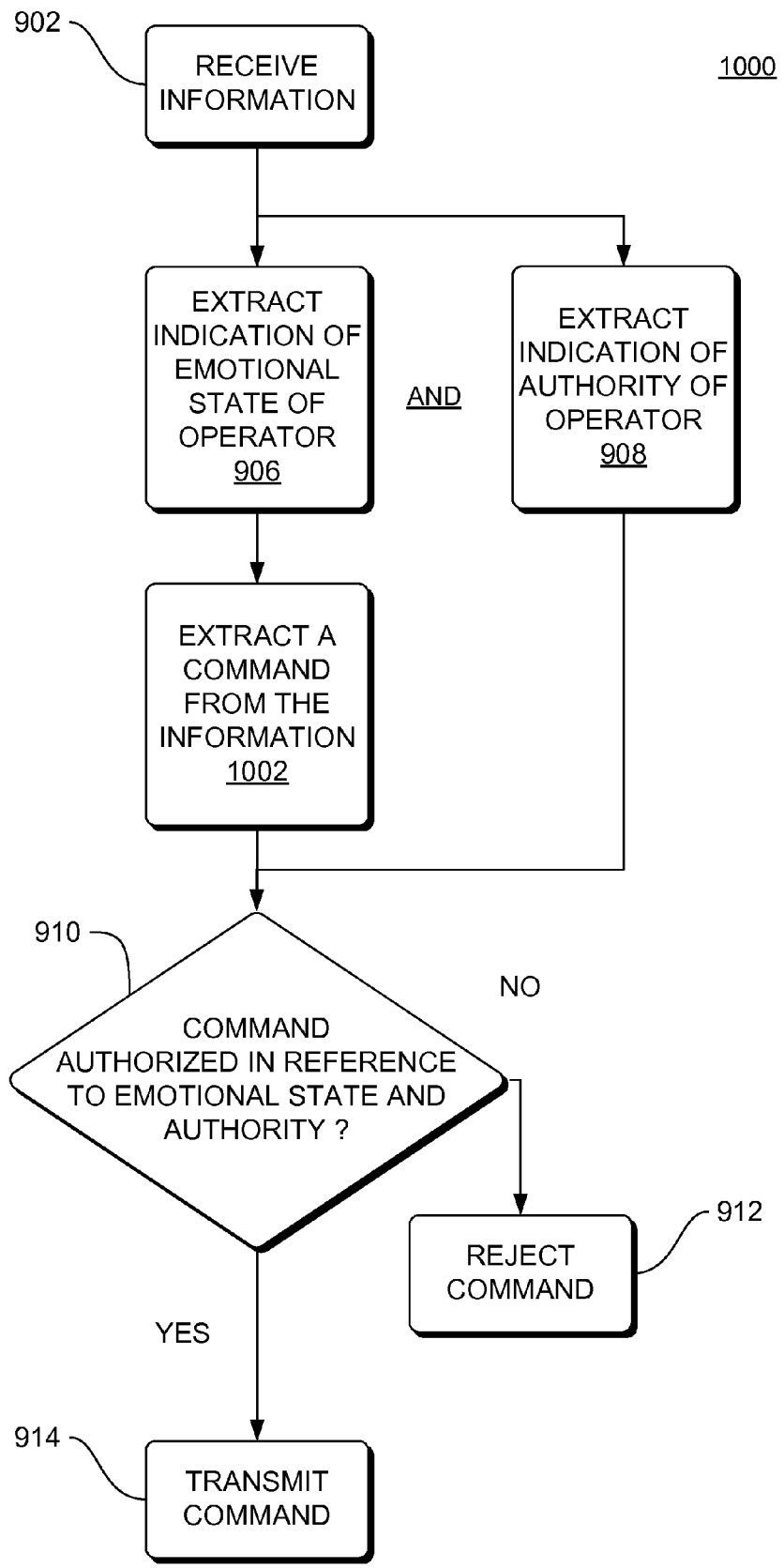
FIG. 10 is a flowchart of a method to control an automatic door, according to an implementation.

FIG. 9 is a flowchart of a method 900 to control an automatic door, according to an implementation. Method 900 receives information from a human and generates a command from the human information, in reference to authority of the human and the state of the mind of the human. Method 900 generates command(s) that are suitable to be processed by a processor in control of an automatic door. In some implementations, method 900 is performed by the command interface unit 102 and FIG. 1 and FIG. 2.

Method 900 includes receiving 902 information from any one of a number of different communication devices. FIG. 5 describes some implementations of communication devices. Method 900 includes processing the information by analyzing the information and extracting 904 a command from the information. Examples of the command include "lock" "unlock" "close" "open" "activate" and "help". Method 900 includes processing the information by analyzing and extracting 906 from the information indicators of the emotional state of the operator, indicators of the competency of the operator, and/or indicators of the state-of-mind of the operator.

Method 900 includes processing the information by analyzing the information and extracting 908 from the information an indicator of the authority of the operator. In some implementations, extracting an indication of authority of the operator includes identifying the operator. For example, where the information 902 is audio information from a human speaker, the identity of the human speaker is determined and the authority of that speaker is then determined. In some implementations, the speech pattern of the human speaker is compared to a database of known humans. The database is created prior to the performance of method 900 from recorded speech sample recordings of humans who are authorized to enter the healthcare facility, such a healthcare providers, non-professional employees of the healthcare facility, people, and friends, relatives and/or coworkers of the operator. Each human whose speech sample is recorded in the database is associated with a particular authority. An example of an authority is "full authority" in which the human is authorized to exercise or command all functions of the lift. Another example of an authority is "no authority in which the human is not authorized to exercise or command any function of the lift. In method 900, the database is accessed and a comparison of the information 902 to the speech samples in the database is performed. When the comparing determines the identity of the human speaker, the authority of the identified human is accessed and used as the indicator of authority of the operator.

In method 900, the command, the state-of-mind and the indicator of authority of the operator is analyzed 910 to an authority database to determine whether or not the command is authorized by the authority of the operator in consideration of the emotional state of the operator. If the command is not authorized by the authority and emotional state of the operator, the command is rejected 912. In some implementations, rejecting 912 the command can include transmitting a notice of an attempted unauthorized command to supervisory personnel or law enforcement agency. If the command is determined to be authorized, the command is transmitted 914 to the processor (e.g. 106 in FIG. 1) and the command 912 is performed by the lift. In some implementations, a log or journal of all extracted commands in action 904 and the determination 910 of the authority of the extracted commands is stored.

Method 1000 includes receiving 902 information from any one of a number of different communication devices. FIG. 5 describes some implementations of communication devices.

Method 1000 includes processing the information by analyzing the information and extracting 908 from the information an indicator of the authority of the operator. In some implementations, extracting an indication of authority of the operator includes identifying the operator. For example, where the information 902 is audio information from a human speaker, the identity of the human speaker is determined and the authority of that speaker is then determined. In some implementations, the speech pattern of the human speaker is compared to a database of known humans. In method 1000, the database is accessed and a comparison of the information 902 to the speech samples in the database is performed. When the comparing determines the identity of the human speaker, the authority of the identified human is accessed and used as the indicator of authority of the operator.

Method 1000 includes processing the information by analyzing the information and extracting 1002 a command from the information. Examples of the command include "lock" "unlock" "close" "open" "activate" and "help". Method 1000 includes processing the information by analyzing and extracting 906 from the information indicators of the emotional state of the operator, indicators of the competency of the operator, and/or indicators of the state-of-mind of the operator.

In method 1000, the command, the state-of-mind and the indicator of authority of the operator is analyzed 910 to an authority database to determine whether or not the command is authorized by the authority of the operator in consideration of the emotional state of the operator. If the command is not authorized by the authority and emotional state of the operator, the command is rejected 912. In some implementations, rejecting 912 the command can include transmitting a notice of an attempted unauthorized command to supervisory personnel or law enforcement agency. If the command is determined to be authorized, the command is transmitted 914 to the processor (e.g. 106 in FIG. 1) and the command 912 is performed by the lift. In some implementations, a log or journal of all extracted commands in action 1002 and the determination 910 of the authority of the extracted commands is stored.

FIG. 11 is a flowchart of a method 1100 to control an automatic door, according to an implementation involving trigger words. Some implementations of method 1100 include receiving audio, at block 1102. A determination is made as to whether or not the volume of the audio is below a threshold for a predetermined amount of time, at block 1104. The audio level being below the threshold for predetermined amount of time is interpreted to be the end of a command sequence from the operator. If the audio level is determined to be not below the threshold for the predetermined amount of time at block 1104, method 1100 continues with receiving audio at block 1102. If the audio level is equal to and/or greater than the audio volume threshold for the predetermined amount of time at block 1104 method 1100 continues by extracting a command from the audio, at block 1106. In some implementations method 1100 also includes determining whether or not the command is a word or phrase in a trigger override word set, at block 1108. Examples of a trigger override word set include the words "stop" "wait" and "help". If the command is determined to be in the trigger override word set at block 1108 then the command is performed at block 1110, and/or movement of the automatic door is ceased. If the command is not determined to be in the trigger override word set at block 1108 then a determination is made as to whether or not the command is in a trigger phrase word set, at block 1112. The trigger phrase word set includes commands such that indicate the intention by the operator to provide a functional command to the automatic door. Examples of a trigger phrase word set include "modoor command" "door command" and "attention". If the command is determined to not be in the trigger phrase word set at block 1112, method 1100 continues with receiving audio at block 1102. If the command is determined to be in the trigger phrase word set at block 1112, the method continues by receiving a next command, at block 1114, and then performing the next command, at block 1116. Examples of commands that are performed at block 1116 include "lock" "unlock" "close" "open" "activate" and "help" or other commands to actuate the automatic door in a particular direction and/or any particular speed.

One example of the predetermined amount of time in method 1100 and method 1200 is two (2) seconds, however other implementations other amounts of time are implemented. One example of the threshold volume of audio in method 1100 is 70 dB, however other implementations of other threshold levels of audio volume are implemented. In some implementations the amount of predetermined time and/or the threshold level of audio volume can be modified through a user configuration interface.

FIG. 12 is a flowchart of a method 1200 to control an automatic door, according to an implementation involving trigger override command set words. Some implementations of method 1200 include receiving audio, at block 1102. A determination is made as to whether or not the volume of the audio is above a threshold for a predetermined amount of time, at block 1202. The audio level being above the threshold for predetermined amount of time is interpreted to indicate a possible emergency situation in the which might be dangerous to operate the actuated-door. If the audio level is determined to be not above the threshold for the predetermined amount of time at block 1202, method 1200 continues with receiving audio at block 1102. If the audio level is greater than the audio volume threshold for the predetermined amount of time at block 1202, method 1200 continues by stopping movement of the automatic door at block 1108 and method 1200 continues with receiving audio at block 1102. One example of the threshold volume of audio in method 1200 is 90 dB, however other implementations of other threshold levels of audio volume are implemented. In some implementations the amount of predetermined time and/or the threshold level of audio volume can be modified through a user configuration interface.

Figure 13:
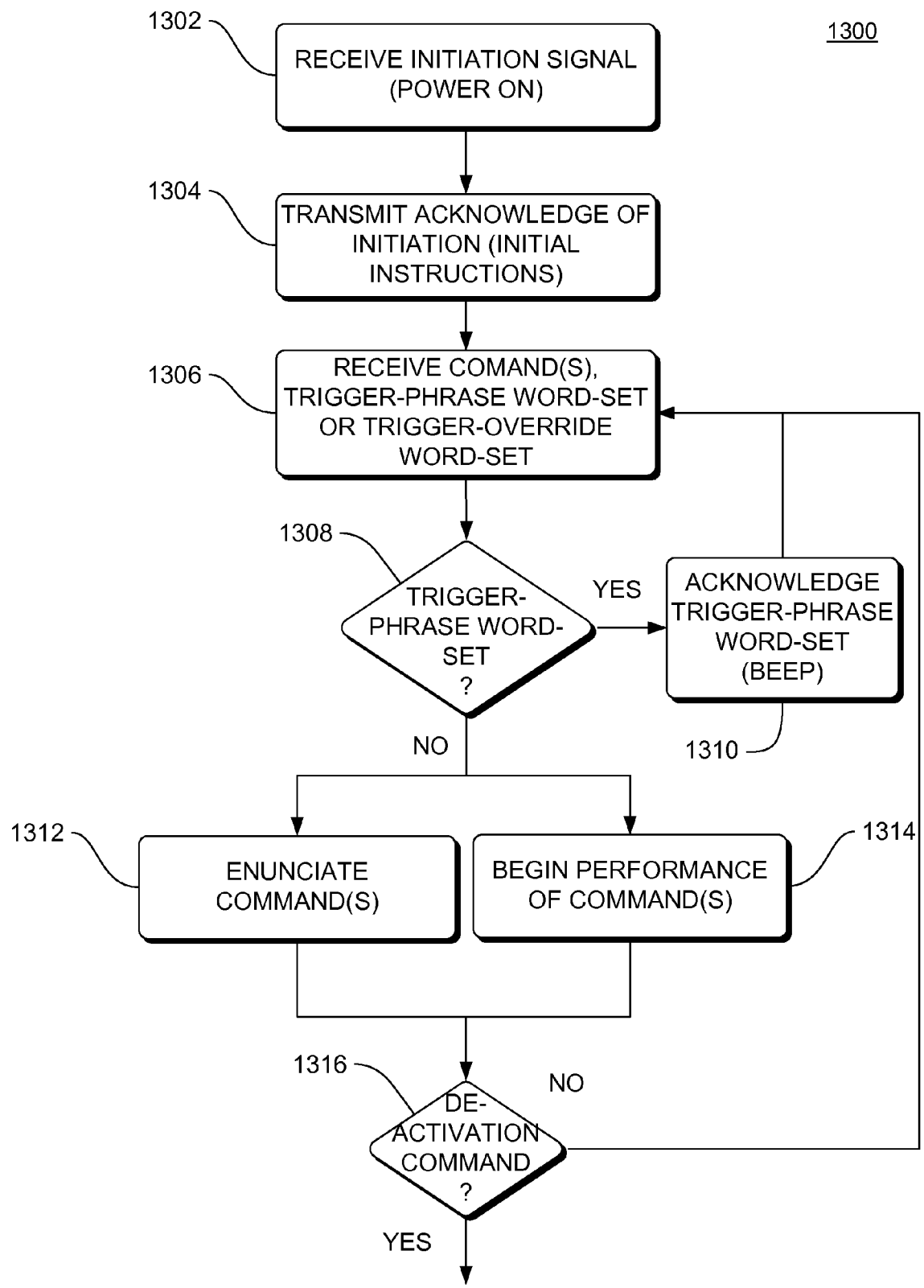
FIG. 13 is a flowchart of a method to control an automatic door, according to an implementation involving trigger words.

FIG. 13 is a flowchart of a method 1300 to control an automatic door, according to an implementation involving disruptive audio volume. Some implementations of method 1300 include receiving an initiation signal at block 1302 and then transmitting an acknowledgment of the initiation signal at block 1304. One example of an initiation signal is an indication of the processor or the automatic door being powered on. One example of an acknowledgment of the initiation is an audio enunciation of instructions on how to operate the system. In some implementations the instructions include a recitation of voice command instructions.

Method 1300 includes receiving a trigger-phrase word-set or trigger-override word-set, at block 1306. In some implementations, trigger-phrase word-set or trigger-override word-set is a recognition of verbiage from an audio signal. The trigger-phrase word-set or trigger-override word-set are described in conjunction with FIG. 11. The trigger-phrase word-set or trigger-override word-set is evaluated or compared to determine if the trigger-phrase word-set or trigger-override word-set is trigger-phrase word-set, at block 1308. If the trigger-phrase word-set or trigger-override word-set is a trigger-phrase word-set, then an acknowledgment of the trigger-phrase word-set presented and the local environment, at block 1310. For example if the trigger-phrase word-set "Molift™ command" is received at block 1306, then a "beep" sound is enunciated. The beep sound provides a cue to the speaker of the trigger-phrase word-set that the system understands that the user has enunciated a trigger-phrase word-set and that the speaker intends to enunciate a command for performance by the system.

If the comparison at block 1308 determines that the trigger-phrase word-set or trigger-override word-set is not a trigger-phrase word-set, in which case the trigger-phrase word-set or trigger-override word-set is a trigger-override word-set or a command, then an acknowledgment of the command or trigger-override word-set is presented to the local environment, at block 1312. For example, the command or the trigger-override word-set is enunciated by a speech generation module. The presentation of the command or the trigger-override word-set at block 1312 provides an acknowledgment of the function that is to be performed by the lift. In method 1300, performance of the command or trigger-override word-set is started at block 1314 and the command or trigger-override word-set is performed simultaneously during the enunciation representation of the command or trigger-override word-set at block 1312. In other implementations not shown the representation or enunciation of the command or trigger-override word-set is completed at block 1312 before performance of the command begins at block 1314.

After the command or trigger-override word-set is presented or enunciated to the user at block 1312 and performance of the command or trigger-override word-set has begun, a determination as to whether or not the command or trigger-override word-set is a command to deactivate, at block 1316. If the command or trigger-override word-set is not a deactivation command, such as "sleep" then control is passed to block 1306. If the command or trigger-override word-set is a deactivation command, then the method 1300 ends.

Figure 14:
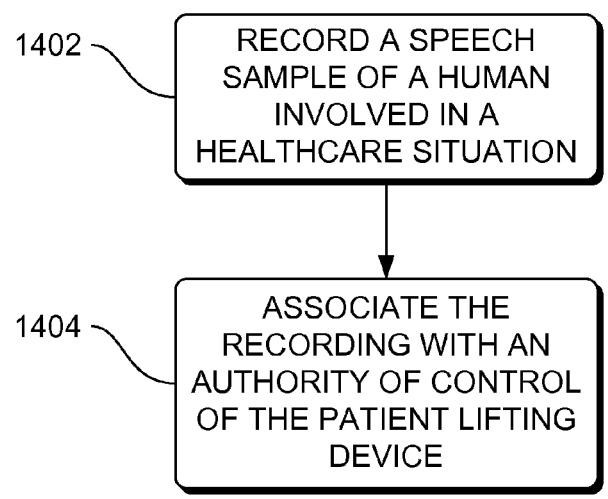
FIG. 14 is a flowchart of a method to update a database of authorities of an automatic door, according to an implementation.

FIG. 14 is a flowchart of a method 1400 to update a database of authorities of an automatic door, according to an implementation. A database of authorities is a database that associates a recording a speech sample of a human with a healthcare relationship authority of control of the automatic door. The database can be accessed as a reference to determine if particular speaker has authority to direct the automatic door to perform a particular command or any commands at all.

Method 1400 includes recording a speech sample of a human, at block 1402. In some implementations, the human is someone who will or could come into contact with a person in a healthcare facility. For example, the human is selected from the group of humans comprising human professional healthcare providers (e.g. physicians, nurses, psychiatrists/psychologists and/or counselors), human non-professional employees of a healthcare facility (e.g. receptionists and/or janitors), people, and friends, relatives and coworkers of the person. In other implementations, the human is not only someone who will or could come into contact with a person in a hospital, but also is someone who works in the healthcare facility but whose job functions would not ordinarily call them into contact with any people, such as an IT worker in the computer data processing department. The benefit of recording a speech sample of only humans who might ordinarily come into contact with a person is that the database of authorities will be more narrowly tailored in scope to the voices that that a voice recognition system might ordinarily be called upon to analyze. The benefit of recording a speech sample of a human whose job functions would not ordinarily call them into contact with any people is that the database of authorities will include speech samples of people who are clearly not authorized to be involved in assistance with the door, thus providing more definitive and conclusive negative identification of authorization by a voice recognition system, which decreases to likelihood of a false positive identification of a speaker by the voice recognition system and/or a false negative identification of the speaker by the voice recognition system.

Method 1400 also includes associating the recording with a healthcare relationship authority of control of the automatic door, at block 1404. In some implementations, the healthcare relationship authority of the human to the at least one person is selected from the group of authorities includes 1) full authority and 2) no authority. A healthcare relationship authority of full authority provides authorization of the human to exercise or command all functions of the lift. A healthcare relationship authority of no authority provides no authority of the human to exercise or command any function of the lift.

Figure 15:
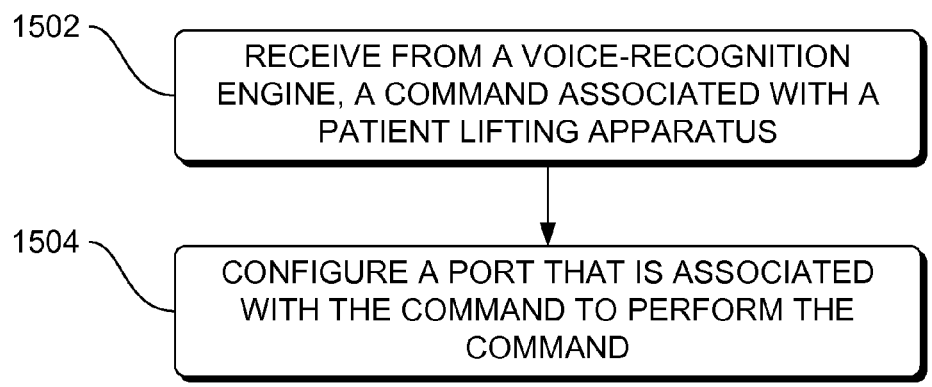
FIG. 15 is a flowchart of a method to control a device-controller of an automatic door, according to an implementation.

FIG. 15 is a flowchart of a method 1500 to control a device-controller of an automatic door, according to an implementation. One example of the device-controller of an automatic door is life device-controller 1816 in FIG. 18.

Method 1500 includes receiving from a voice-recognition unit, a command associated with an automatic door, at block 1502. Method 1500 also includes configuring a port to perform the command, at block 1504. The port is associated with the command. The mere configuring the port causes the automatic door to perform the command. Methods 1600 and 1700 describe more specific implementations of method 1500.

Figure 16:
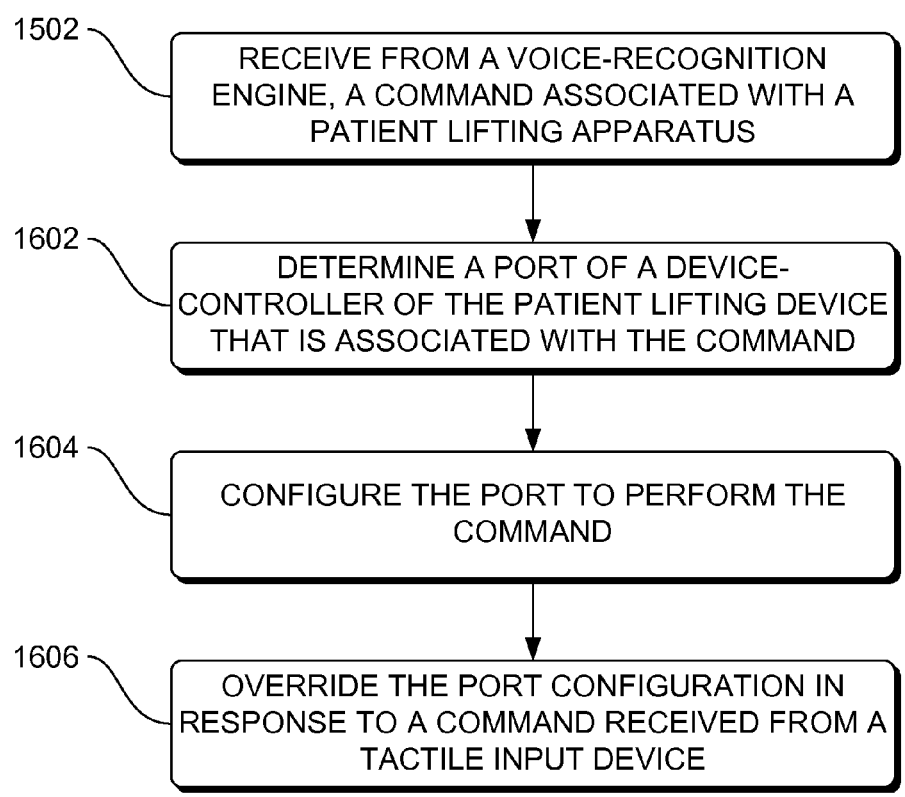
FIG. 16 is a flowchart of a method to control a device-controller of an automatic door, according to an implementation.

FIG. 16 is a flowchart of a method 1600 to control a device-controller of an automatic door, according to an implementation. Method 1600 is one implementation of method 1500.

Method 1600 includes receiving from a voice-recognition unit, a command associated with an automatic door, at block 1502. Method 1600 also includes determining or identifying which port of the device-controller of the automatic door is associated with the command, at block 1602. In some implementations, the association between the port of the device-controller of the automatic door and the command is a direct correspondence.

Method 1600 also includes configuring the identified port in order to perform the command, at block 1604. Various techniques of configuring the port using relays are described in methods 1700 and 1800.

Some implementations of method 1600 also include overriding the configuration of the port in response to a command received from a tactile input device, such as a hand-held controller, or an input device other than a microphone and voice-recognition unit. The configuration of the port is overridden to provide higher priority to the other input device, which is helpful in some situations where the command from the other input device is considered to be more reliable and/or accurate or where the command from the other input device is designated for any reason or even arbitrarily as being the input device with the highest priority.

Figure 17:
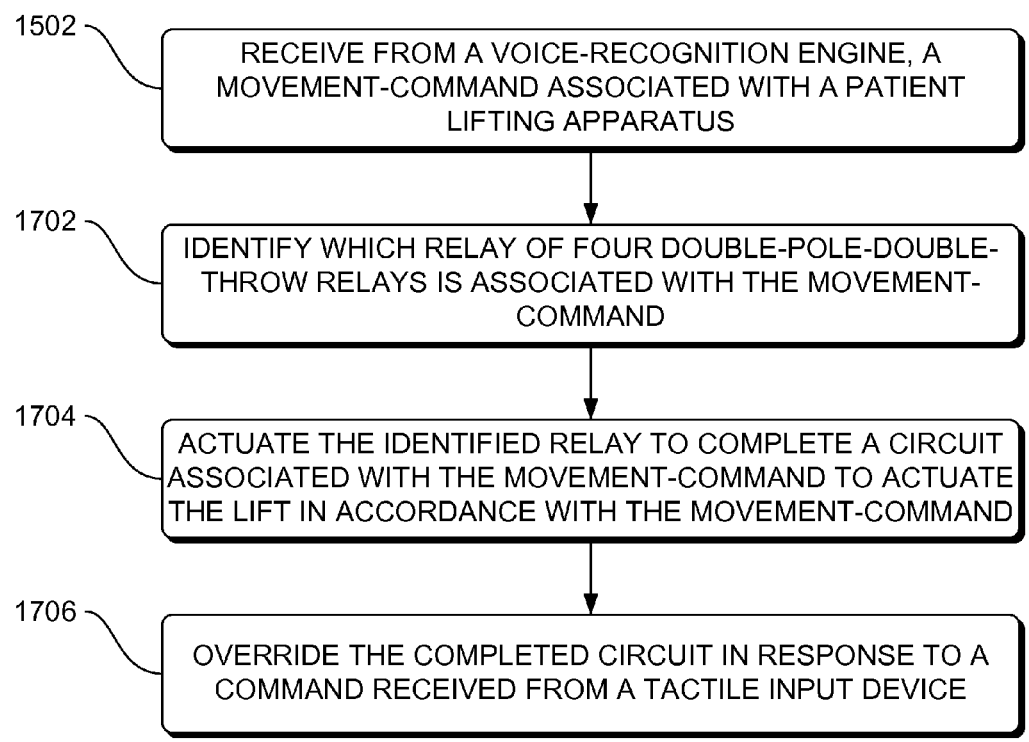
FIG. 17 is a flowchart of a method to control a device-controller of an automatic door, according to an implementation.

FIG. 17 is a flowchart of a method 1700 to control a device-controller of an automatic door, according to an implementation. Method 1700 is one implementation of method 1500.

Method 1700 includes receiving from a voice-recognition unit, a movement-command associated with an automatic door, at block 1502. The movement command can be in anyone of a number of electronic formats, such as a transient signal, a text-encoded binary representation, and/or a numerical representation encoded in binary.

Figure 32:
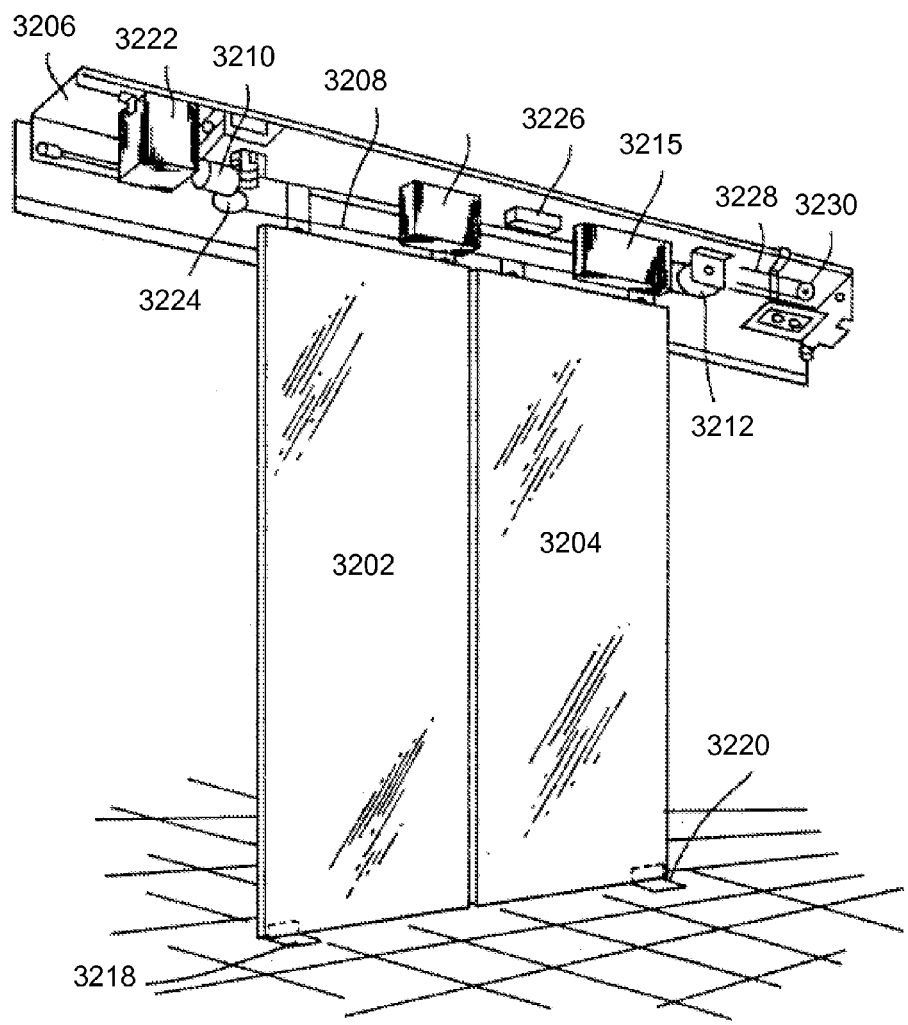
FIG. 32 is a schematic perspective view of an automatic electric sliding door, according to an implementation having two door panels.
Figure 33:
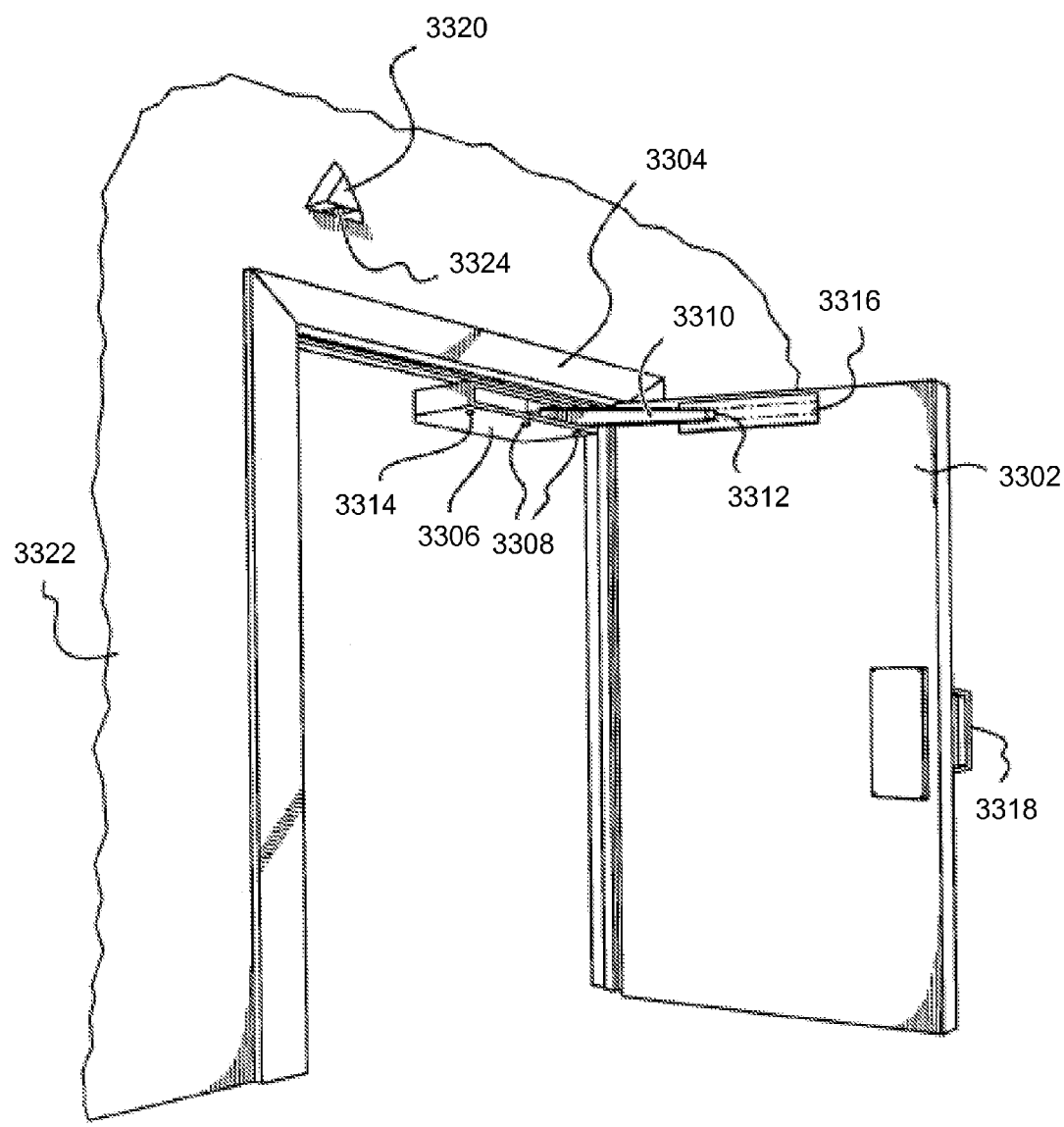
FIG. 33 is a block diagram of a one dimensional automatic door, according to an implementation that is specifically adapted for lifting a person in and out of a pool.

In regards to the movement-command, in some implementations in which the actuated-door provides electrically or hydraulically actuated movement to only open and close such as shown in FIG. 33, the movement-command is one of two different commands, "open" and "close". In some implementations in which the actuated-door provides electrically or hydraulically actuated movement to open, close, lock and unlock, such as in FIG. 32, the movement-command is one of four different commands, "lock" "unlock" "close" and "open". In some implementations in which the actuated-door provides electrically or hydraulically actuated movement to open, close, lock and unlock and includes safety commands, the movement-command is one of seven different commands, "lock" "unlock" "close" "open" "halt" "stop" and "help".

Further in regard to the movement-command, in some implementations in which the actuated-door has a safety halt feature and that provides electrically or hydraulically actuated movement open and close such as shown in FIG. 33, the movement-command is one of five different commands, "open" "close" "stop" halt" and "help". The "stop" halt" and "help" commands are cessation-commands that can be enunciated by an operator to end movement of the actuated-door. In some implementations in which the actuated-door has a safety halt feature and that provides electrically or hydraulically actuated movement to open, close, lock and unlock such as shown in FIG. 32, the movement-command is one of eight different commands, "lock" "unlock" "close" "open" "stop" halt" and "help". In some implementations in which the actuated-door has a safety halt feature and that provides electrically or hydraulically actuated movement in three dimensions (throughout a volume), the movement-command is one of nine different commands, "lock" "unlock" "close" "open" "in" "out" "stop" halt" and "help".

Method 1700 also includes identifying or determining which relay of a plurality of relays is associated with the movement-command, at block 1702. The number of relays is equal to the number of movement-commands that are not "halt" or "stop". One relay for each direction of movement. For example, where the movement-commands are "lock" "unlock" "close" and "open" the number of relays is four. In another example, where the movement-commands are "lock" "unlock" "close" "open" "in" and "out" the number of relays is six.

In some implementations, each of the plurality of relays is a single-pole-single-throw relay. In other implementations, each of the plurality of relays is a double-pole-double-throw (DPDT) relay. In other implementations, some of the plurality of relays is a single-pole-single-throw relay and some of the plurality of relays is a DPDT relay.

Method 1700 also includes actuating the identified relay, at block 1704. Actuating the identified relay causes a circuit to be completed or closed, in which the completed/closed circuit being associated with the movement-command. Completion/closing of the circuit that is associated with the direction of movement of the automatic door that is the same as the movement-command actuates the automatic door in accordance with the movement-command.

A normally open (NO) relay is implemented in situations where movement is actuated by completing a circuit, such as described at block 1704. However, in other implementations where movement is actuated by opening or breaking a circuit, a normally-closed (NC) relay is used.

Some implementations of method 1700 also include override the completed circuit in response to a command received from a tactile input device, such as a hand-held controller, or an input device other than a microphone and voice-recognition unit, at block 1706. One implementation of overriding the completed circuit is opening the circuit. The completed circuit is overridden to provide higher priority to the other input
device, which is helpful in some situations where the command from the other input device is considered to be more reliable and/or accurate or the command from the other input device is designated rather arbitrarily as being the input device with the highest priority.

Figure 18:
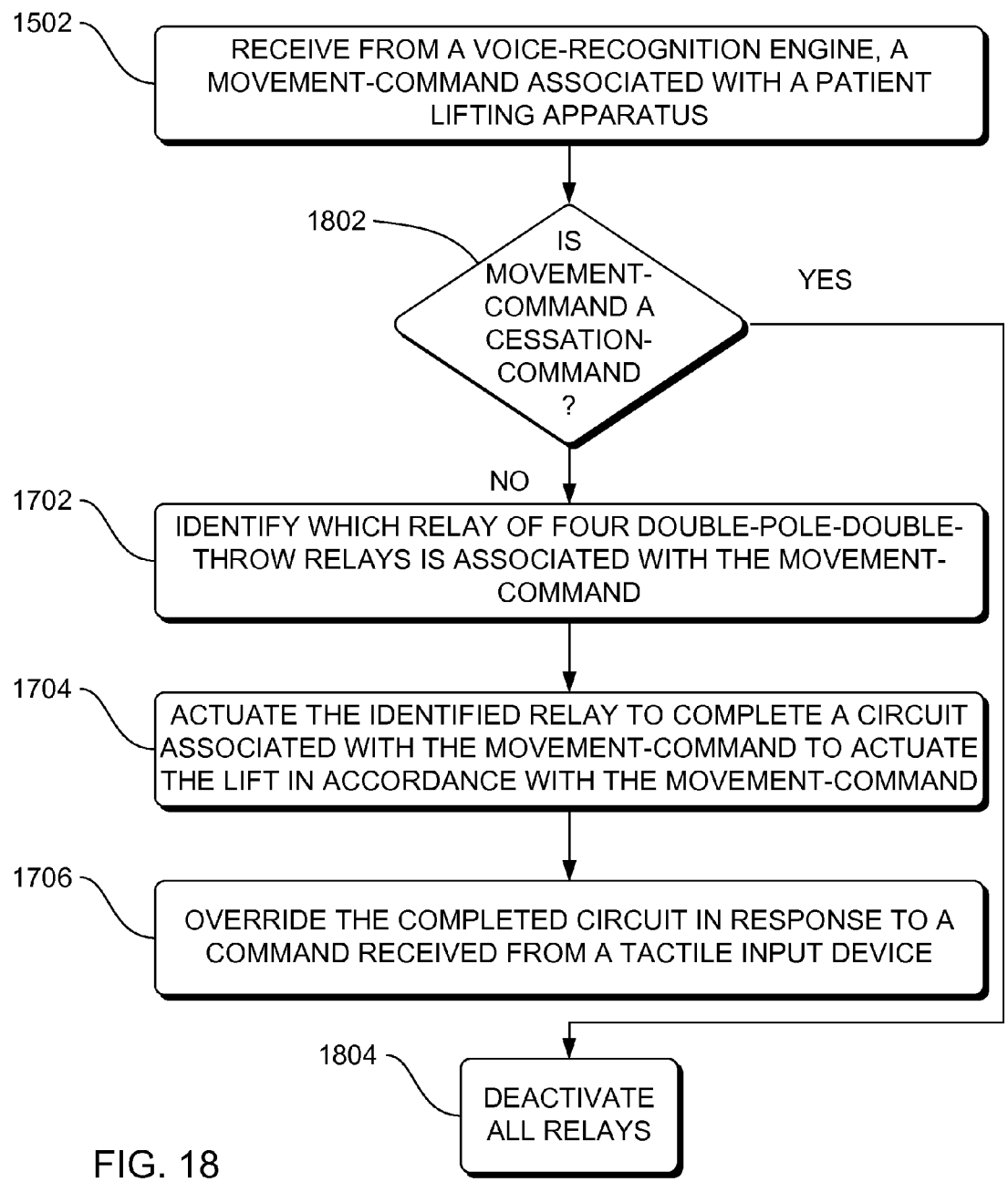
FIG. 18 is a flowchart of a method to control a device-controller of an automatic door, according to an implementation.

FIG. 18 is a flowchart of a method 1800 to control a device-controller of an automatic door, according to an implementation. Method 1800 is one implementation of method 1700.

In method 1800, after the movement-command is received from the voice-recognition engine, the movement-command is tested to determine or evaluate if the movement-command is a cessation-command, at block 1802. Examples of cessation-command include "stop" "halt" and "help". If the movement-command is a cessation-command, then in some implementations, all relays are deactivated (e.g. normally-open relays are opened) at block 1804. In other, implementations, if the movement-command is a cessation-command, then only the actuated (active) relay(s) are deactivated. If the movement-command is not a cessation-command, then the method proceeds with the next action of identifying or determining which relay of a plurality of relays is associated with the movement-command, at block 1702, and continuing thereafter.

Figure 19:
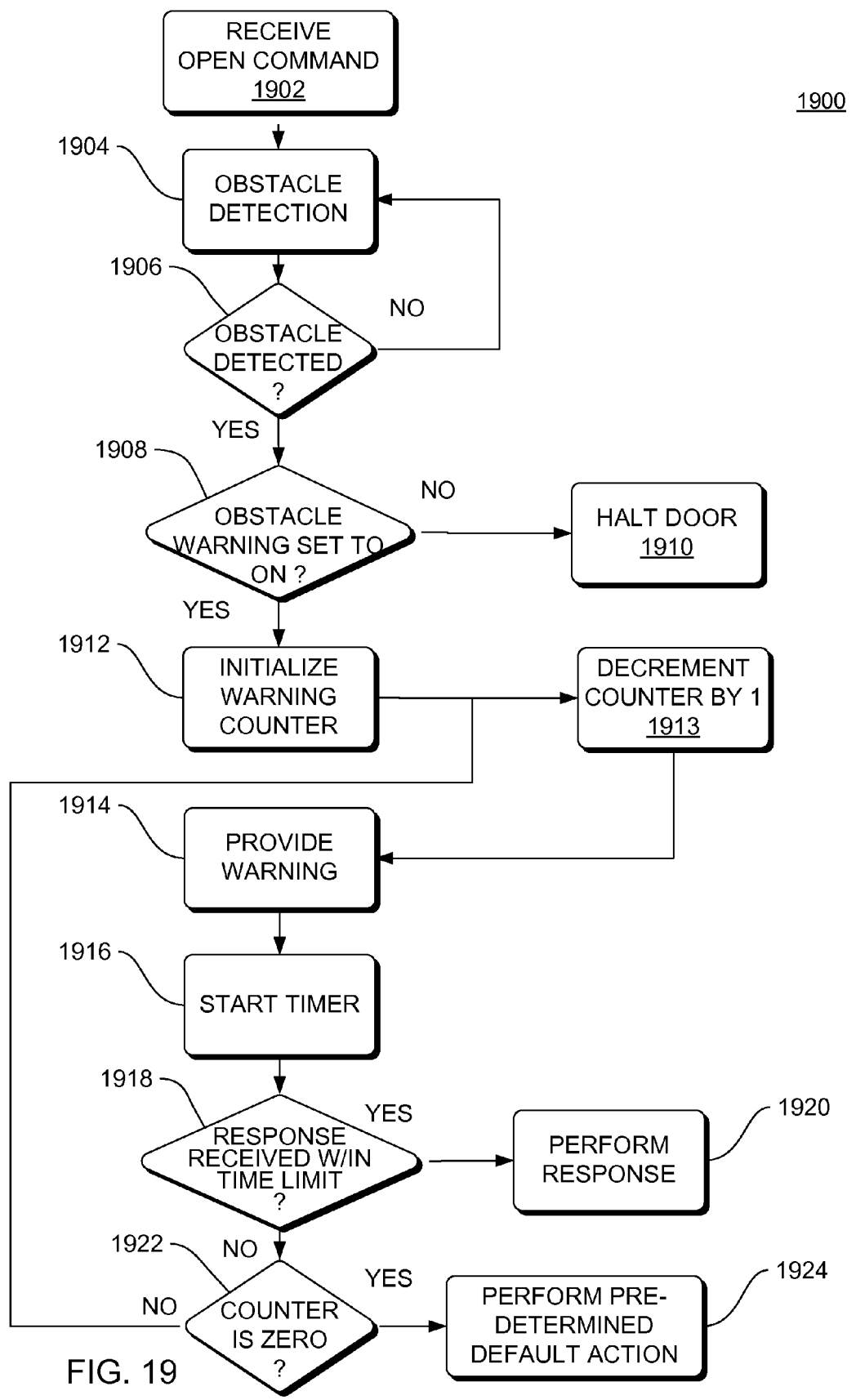
FIG. 19 is a flowchart of a method of detecting, evaluating and responding to an obstacle in the path of an automatic door while opening, according to an implementation.

FIG. 19 is a flowchart of a method 1900 of detecting, evaluating and responding to an obstacle in the path of an automatic door while opening, according to an implementation.

In method 1900, an "open" command is received at block 1902. In response to the receipt of an "open" command at block 1902, an obstacle detection process is initiated and is performed continuously in some implementation or is performed intermittently in some implementations while the door is being opened at block 1904, until an obstacle is detected at block 1906. In response to an obstacle being detected at block 1906, an obstacle warning parameter is evaluated at 1908. In some implementations in which the obstacle warning parameter is a Boolean object, if the obstacle warning parameter is set to NO or 0, the opening of the door is halted at block 1910 and if the obstacle warning parameter is set to YES or 1, a warning counter is initialized at block 1912. The warning counter is set to the maximum number of iterations of a warning.

In response to the warning counter being initialized at block 1912, a loop is entered which is performed at maximum the number of times indicated by the warning counter in which an obstacle warning is provided at block 1914, and a response is polled at blocks 1916 and 1918 and if no response is received then a predetermined default action is performed at block 1924 otherwise a command in accordance with the response is performed by the automatic door controller at block 1920.

In response to the warning counter being initialized at block 1912, the warning counter is decremented by 1 at block 1913, an obstacle warning is provided at block 1914 and a timer is started at block 1916. An example of an obstacle warning is "An obstacle has been detected. Do you want to Stop, Open or Close the door?" If a response to the obstacle warning is received within the time limit at block 1918, in some implementations, a command in accordance with the response is performed by the automatic door controller at block 1920. In some implementations the only recognized responses are "stop" "open" and "close". The response can be provided in a number of manners, such as speech recognition or receiving a signal from a hand held controller. In some implementations in which security of the facilities in which the door is located is an issue, the response to the obstacle warning is performed in accordance with either method 300 or method 400 in which the response is evaluated for authority of the operator from which the response originated and the response is performed in accordance with the authority of the operator from which the response originated. If a response to the obstacle warning is not received within the time limit at block 1918, the warning counter is evaluated in comparison to zero. If the warning counter is zero, the predetermined default action is performed at block 1924. If the warning counter is not zero, the method 1900 continues with decrementing the warning counter by 1 at block 1913.

In summary of a particular implementation of method 1900, when an obstacle is detected at block 1906 in the path of an opening door, if the obstacle warning parameter is determined to be set to true at block 1908, an obstacle warning is announced at block 1914. An example of an obstacle warning is "An obstacle has been detected. Do you want to Stop, Open or Close the door?". After a specified period of time if a response is not detected at block 1918, the announcement is repeated at block 1914. After the second specified period of time if a response is not detected at block 1918, default action is repeated at block 1924, which can be stop (halt) the door movement, open the door or close the door.

Method 1900 provides a manner of opening a door that reduces physical danger and in some situations provides an added aspect of security.

Figure 20:
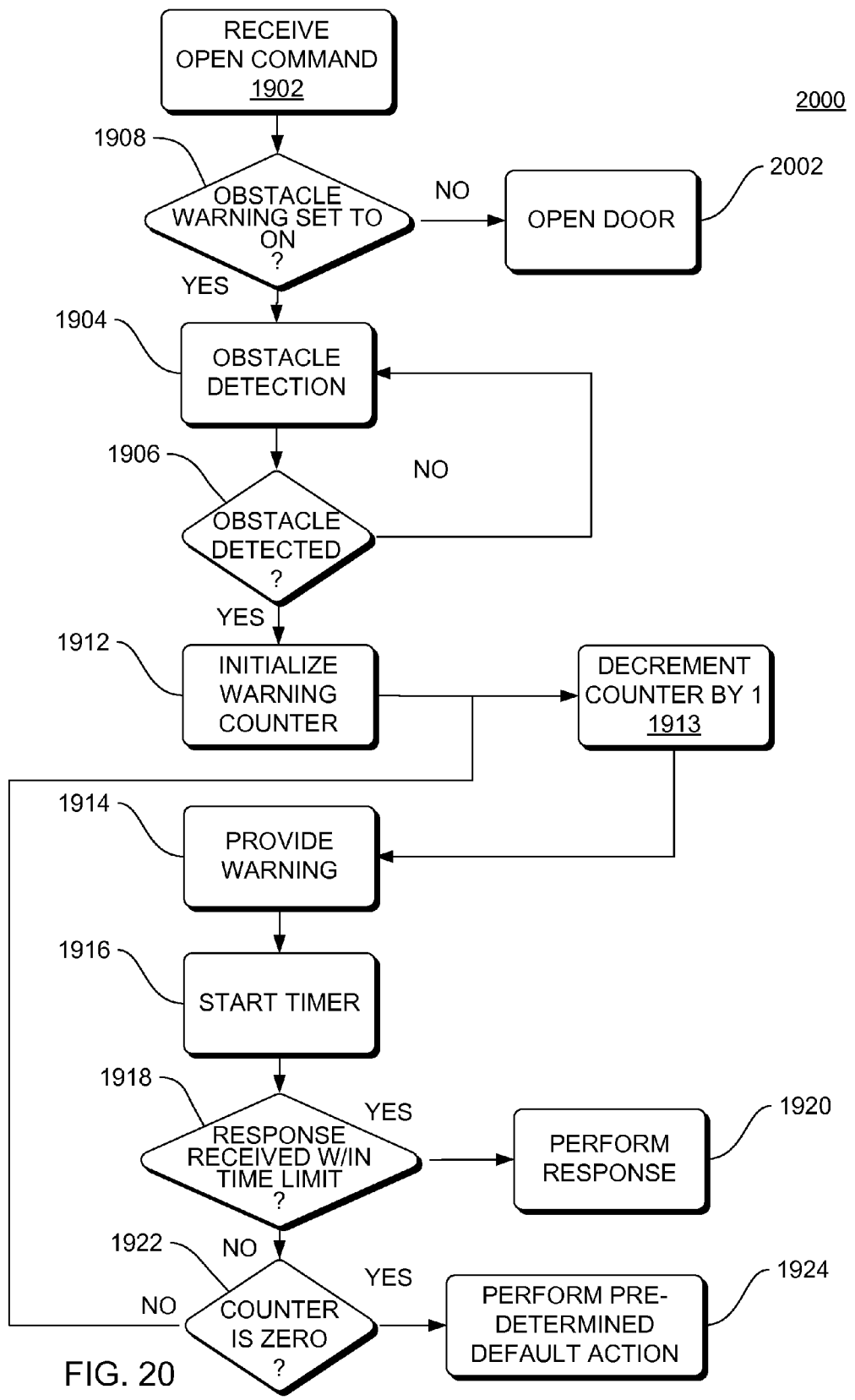
FIG. 20 is a flowchart of a method of detecting, evaluating and responding to an obstacle in the path of an automatic door while opening, according to an implementation.

FIG. 20 is a flowchart of a method 2000 of detecting, evaluating and responding to an obstacle in the path of an automatic door while opening, according to an implementation.

In method 2000, an "open" command is received at block 1902. In response to the receipt of an "open" command at block 1902, an obstacle warning parameter is evaluated at 1908. In some implementations in which the obstacle warning parameter is a Boolean object, if the obstacle warning parameter is set to NO or 0, the door is opened at block 2002 and if the obstacle warning parameter is set to YES or 1, an obstacle detection process is initiated and is performed continuously in some implementation or is performed intermittently in some implementations while the door is being opened at block 1904, until an obstacle is detected at block 1906. In response to an obstacle being detected at block 1906, a warning counter is initialized at block 1912. The warning counter is set to the maximum number of iterations of a warning.

In method 2000, in response to the warning counter being initialized at block 1912, a loop is entered which is performed at maximum the number of times indicated by the warning counter in which an obstacle warning is provided at block 1914, and a response is polled at blocks 1916 and 1918 and if no response is received then a predetermined default action is performed at block 1924 otherwise a command in accordance with the response is performed by the automatic door controller at block 1920.

In method 2000, in response to the warning counter being initialized at block 1912, the warning counter is decremented by 1 at block 1913, an obstacle warning is provided at block 1914 and a timer is started at block 1916. An example of an obstacle warning is "An obstacle has been detected. Do you want to Stop, Open or Close the door?" If a response to the obstacle warning is received within the time limit at block 1918, in some implementations, a command in accordance with the response is performed by the automatic door controller at block 1920. In some implementations the only recognized responses are "stop" "open" and "close". The response can be provided in a number of manners, such as speech recognition or receiving a signal from a hand held controller. In some implementations in which security of the facilities in which the door is located is an issue, the response to the obstacle warning is performed in accordance with either method 300 or method 400 in which the response is evaluated for authority of the operator from which the response originated and the response is performed in accordance with the authority of the operator from which the response originated. If a response to the obstacle warning is not received within the time limit at block 1918, the warning counter is evaluated in comparison to zero. If the warning counter is zero, the predetermined default action is performed at block 1924. If the warning counter is not zero, the method 2000 continues with decrementing the warning counter by 1 at block 1913.

In summary of a particular implementation of method 2000, if the obstacle warning parameter is determined to be set to true at block 1908, when an obstacle is detected at block 1906 in the path of an opening door, an obstacle warning is announced at block 1914. An example of an obstacle warning is "An obstacle has been detected. Do you want to Stop, Open or Close the door?". After a specified period of time if a response is not detected at block 1918, the announcement is repeated at block 1914. After the second specified period of time if a response is not detected at block 1918, default action is repeated at block 1924, which can be stop (halt) the door movement, open the door or close the door.

Method 2000 provides a manner of opening a door that reduces physical danger and in some situations provides an added aspect of security.

Figure 21:
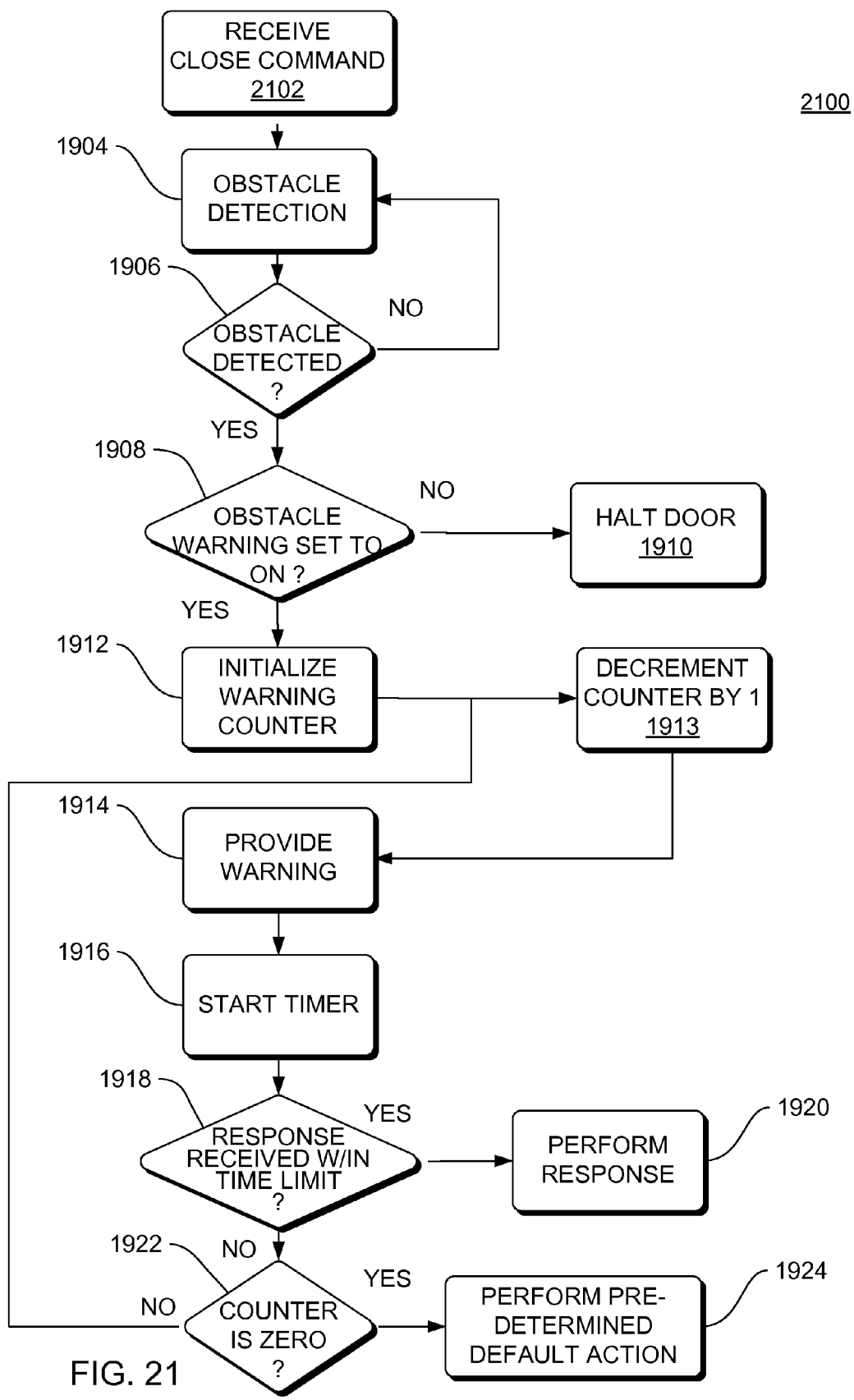
FIG. 21 is a flowchart of a method of detecting, evaluating and responding to an obstacle in the path of an automatic door while closing, according to an implementation.

FIG. 21 is a flowchart of a method 2100 of detecting, evaluating and responding to an obstacle in the path of an automatic door while closing, according to an implementation.

In method 2100, a "close" command is received at block 1902. In response to the receipt of a "close" command at block 1902, an obstacle detection process is initiated and is performed continuously in some implementation or is performed intermittently in other implementations while the door is being closed at block 1904, until an obstacle is detected at block 1906. In response to an obstacle being detected at block 1906, an obstacle warning parameter is evaluated at 1908. In some implementations in which the obstacle warning parameter is a Boolean object, if the obstacle warning parameter is set to NO or 0, the closing of the door is halted at block 1910 and if the obstacle warning parameter is set to YES or 1, a warning counter is initialized at block 1912. The warning counter is set to the maximum number of iterations of a warning.

In method 2100, in response to the warning counter being initialized at block 1912, a loop is entered which is performed at maximum the number of times indicated by the warning counter in which an obstacle warning is provided at block 1914, and a response is polled at blocks 1916 and 1918 and if no response is received then a predetermined default action is performed at block 1924 otherwise a command in accordance with the response is performed by the automatic door controller 114 at block 1920.

In method 2100, in response to the warning counter being initialized at block 1912, the warning counter is decremented by 1 at block 1913, an obstacle warning is provided at block 1914 and a timer is started at block 1916. An example of an obstacle warning is "An obstacle has been detected. Do you want to Stop, Open or Close the door?" If a response to the obstacle warning is received within the time limit at block 1918, in some implementations, a command in accordance with the response is performed by the automatic door controller 114 at block 1920. In some implementations the only recognized responses are "stop" "open" and "close". The response can be provided in a number of manners, such as speech recognition or receiving a signal from a hand held controller. In some implementations in which security of the facilities in which the door is located is an issue, the response to the obstacle warning is performed in accordance with either method 300 or method 400 in which the response is evaluated for authority of the operator from which the response originated and the response is performed in accordance with the authority of the operator from which the response originated. If a response to the obstacle warning is not received within the time limit at block 1918, the warning counter is evaluated in comparison to zero. If the warning counter is zero, the predetermined default action is performed at block 1924. If the warning counter is not zero, the method 2100 continues with decrementing the warning counter by 1 at block 1913.

In summary of a particular implementation of method 2100, when an obstacle is detected at block 1906 in the path of a closing door, if the obstacle warning parameter is determined to be set to true at block 1908, an obstacle warning is announced at block 1914. An example of an obstacle warning is "An obstacle has been detected. Do you want to Stop, Open or Close the door?". After a specified period of time if a response is not detected at block 1918, the announcement is repeated at block 1914. After the second specified period of time if a response is not detected at block 1918, default action is repeated at block 1924, which can be stop (halt) the door movement, open the door or close the door.

Method 2100 provides a manner of closing a door that reduces physical danger and in some situation provides an added aspect of security.

Figure 22:
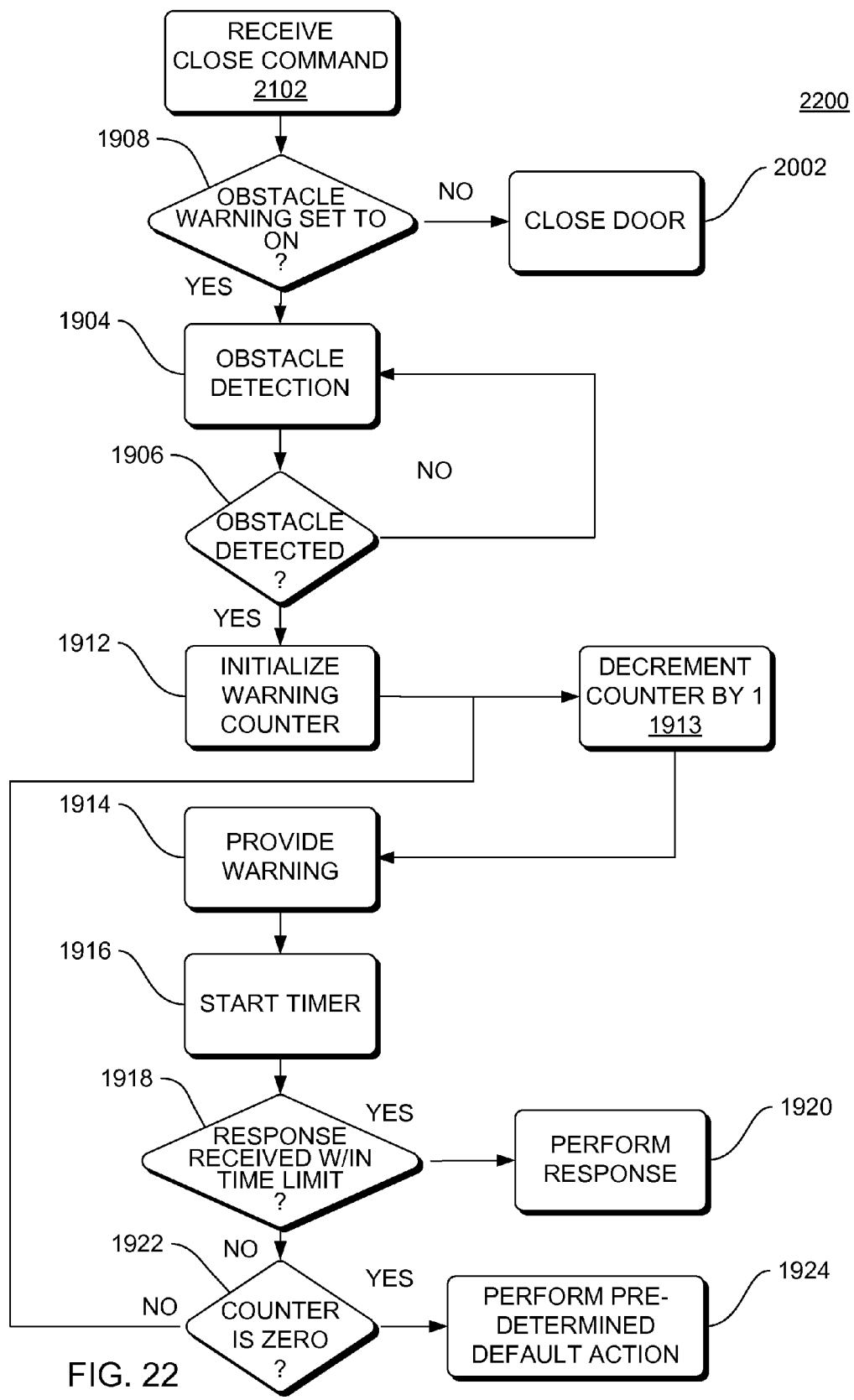
FIG. 22 is a flowchart of a method of detecting, evaluating and responding to an obstacle in the path of an automatic door while closing, according to an implementation.

FIG. 22 is a flowchart of a method 2200 of detecting, evaluating and responding to an obstacle in the path of an automatic door while closing, according to an implementation.

In method 2200, a "close" command is received at block 2102. In response to the receipt of the "close" command at block 2102, an obstacle warning parameter is evaluated at 1908. In some implementations in which the obstacle warning parameter is a Boolean object, if the obstacle warning parameter is set to NO or 0, the door is closed at block 2002 and if the obstacle warning parameter is set to YES or 1, an obstacle detection process is initiated and is performed continuously in some implementation or is performed intermittently in some implementations while the door is being closed at block 1904, until an obstacle is detected at block 1906. In response to an obstacle being detected at block 1906, a warning counter is initialized at block 1912. The warning counter is set to the maximum number of iterations of a warning.

In method 2200, in response to the warning counter being initialized at block 1912, a loop is entered which is performed at maximum the number of times indicated by the warning counter in which an obstacle warning is provided at block 1914, and a response is polled at blocks 1916 and 1918 and if no response is received then a predetermined default action is performed at block 1924 otherwise a command in accordance with the response is performed by the automatic door controller 114 at block 1920.

In method 2200, in response to the warning counter being initialized at block 1912, the warning counter is decremented by 1 at block 1913, an obstacle warning is provided at block 1914 and a timer is started at block 1916. An example of an obstacle warning is "An obstacle has been detected. Do you want to Stop, Open or Close the door?" If a response to the obstacle warning is received within the time limit at block 1918, in some implementations, a command in accordance with the response is performed by the automatic door controller 114 at block 1920. In some implementations the only recognized responses are "stop" "open" and "close". The response can be provided in a number of manners, such as speech recognition or receiving a signal from a hand held controller. In some implementations in which security of the facilities in which the door is located is an issue, the response to the obstacle warning is performed in accordance with either method 300 or method 400 in which the response is evaluated for authority of the operator from which the response originated and the response is performed in accordance with the authority of the operator from which the response originated. If a response to the obstacle warning is not received within the time limit at block 1918, the warning counter is evaluated in comparison to zero. If the warning counter is zero, the predetermined default action is performed at block 1924. If the warning counter is not zero, the method 2200 continues with decrementing the warning counter by 1 at block 1913.

In summary of a particular implementation of method 2200, if the obstacle warning parameter is determined to be set to true at block 1908, when an obstacle is detected at block 1906 in the path of a closing door, an obstacle warning is announced at block 1914. An example of an obstacle warning is "An obstacle has been detected. Do you want to Stop, Open or Close the door?". After a specified period of time if a response is not detected at block 1918, the announcement is repeated at block 1914. After the second specified period of time if a response is not detected at block 1918, default action is repeated at block 1924, which can be stop (halt) the door movement, open the door or close the door.

Method 2200 provides a manner of closing a door that reduces physical danger and in some situations provides an added aspect of security.

Figure 23:
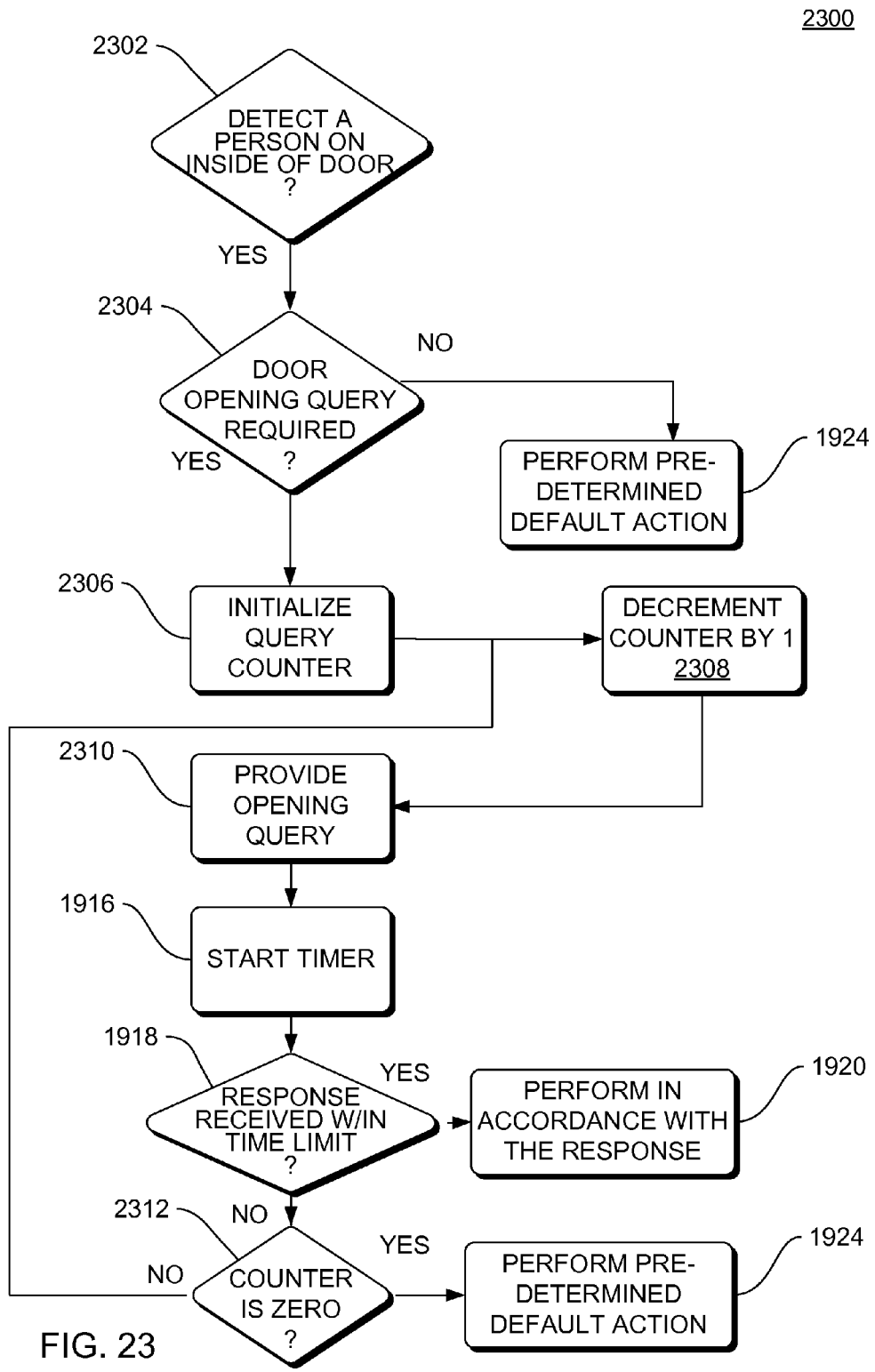
FIG. 23 is a flowchart of a method of detecting, evaluating and responding to a person on the interior side of an exterior door, according to an implementation.

FIG. 23 is a flowchart of a method 2300 of detecting, evaluating and responding to a person on the interior side of an exterior door, according to an implementation.

In method 2300, a presence of a person is detected on the interior side of an exterior door, at block 2302. The detecting can be performed using conventional motion or object detection processes. In response to detecting the presence of a person on the interior side of an exterior door, at block 2302, a door-opening-query parameter is evaluated at 2304. In some implementations in which the door-opening-query parameter is a Boolean object, if the door-opening-query parameter is set to NO or 0, a predetermined default action is performed at block 1924 and if the door-opening-query parameter is set to YES or 1, a query counter is initialized at block 2306. The predetermined default action can be stop (halt) the door movement, open the door, lock the door, unlock the door or close the door. In some implementations, the predetermined default action is dependent upon an identity of the person. In response to an obstacle being detected at block 1906, a query counter is initialized at block 1912. The query counter is set to the maximum number of iterations of a warning.

In method 2300, in response to the query counter being initialized at block 2306, a loop is entered which is performed at maximum the number of times indicated by the query counter in which an door-opening-query is provided at block 2310, and a response is polled at blocks 1916 and 1918 and if no response is received then a predetermined default action is performed at block 1924 otherwise an operation in accordance with the response is performed by the door at block 2314.

In method 2300, in response to the query counter being initialized at block 1912, the query counter is decremented by 1 at block 2308, a door-opening-query is provided at block 2310 and a timer is started at block 1916. An example of the door-opening-query is "A person is at the front door. Do you want to open the door?" If a response to the door-opening-query is received within the time limit at block 1918, in some implementations, an operation in accordance with the response is performed by the door at block 2314. For example of block 2314, if the response is "YES" to a query of "A person is at the front door. Do you want to open the door?" then the door is instructed to perform an open operation.

In some implementations the only recognized responses are "YES", "OPEN", OR "NO". In some implementations the only recognized responses are "YES", "OPEN", "LOCK THE DOOR" OR "NO". The response can be provided in a number of manners, such as speech recognition or receiving a signal from a hand held controller. In some implementations in which security of the facilities in which the door is located is an issue, the response to the door-opening-query is performed in accordance with either method 300 or method 400 in which the response is evaluated for authority of the operator from which the response originated and the response is performed in accordance with the authority of the operator from which the response originated. If a response to the door-opening-query is not received within the time limit at block 1918, the query counter is evaluated in comparison to zero. If the query counter is zero, the predetermined default action is performed at block 1924. If the query counter is not zero, the method 2300 continues with decrementing the query counter by 1 at block 2308.

In summary of a particular implementation of method 2300, when a person is detected on the interior side of an exterior door, at block 2302, if the door opening query parameter is determined to be set to true at block 2304, an opening query is announced at block 2310. An example of an opening query is "A person is at the front door. Do you want to open the door?". After a specified period of time if a response is not detected at block 1918, the opening query is repeated at block 1914. After the second specified period of time if a response is not detected at block 1918, default action is repeated at block 1924, which can be stop (halt) the door movement, open the door, lock the door, unlock the door or close the door.

Method 2300 provides a manner of controlling a door that reduces physical danger and in some situations provides an added aspect of security.

Figure 24:
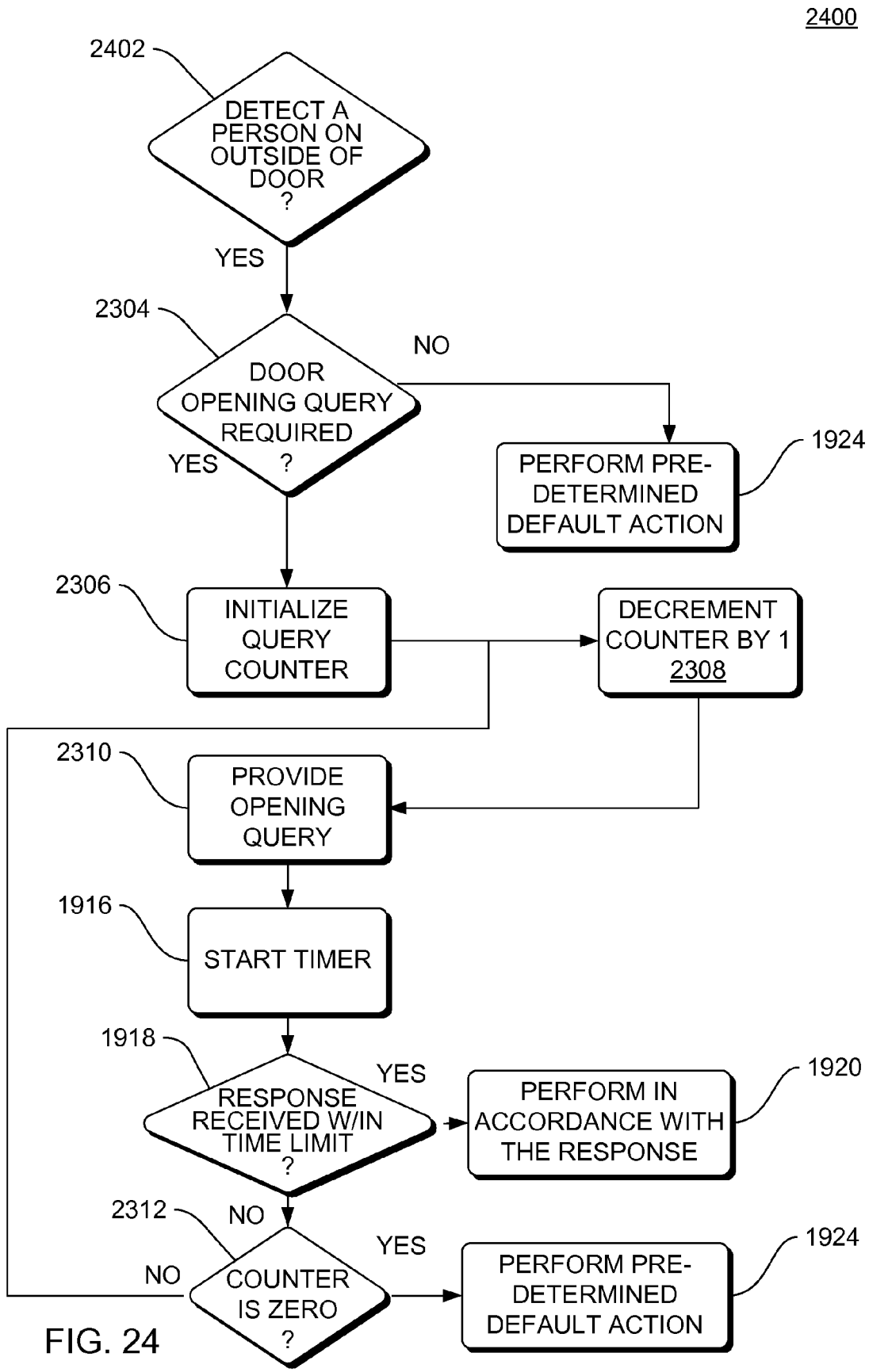
FIG. 24 is a flowchart of a method of detecting, evaluating and responding to a person on the exterior side of an exterior door, according to an implementation.

FIG. 24 is a flowchart of a method 2400 of detecting, evaluating and responding to a person on the exterior side of an exterior door, according to an implementation.

In method 2400, a presence of a person is detected on the exterior side of an exterior door, at block 2302. The detecting can be performed using conventional motion or object detection processes. In response to detecting the presence of a person on the exterior side of an exterior door, at block 2302, a door-opening-query parameter is evaluated at 2304. In some implementations in which the door-opening-query parameter is a Boolean object, if the door-opening-query parameter is set to NO or 0, a predetermined default action is performed at block 1924 and if the door-opening-query parameter is set to YES or 1, a query counter is initialized at block 2306. The predetermined default action can be stop (halt) the door movement, open the door, lock the door, unlock the door or close the door. In some implementations, the predetermined default action is dependent upon an identity of the person. In response to an obstacle being detected at block 1906, a query counter is initialized at block 1912. The query counter is set to the maximum number of iterations of a warning.

In method 2400, in response to the query counter being initialized at block 2306, a loop is entered which is performed at maximum the number of times indicated by the query counter in which an door-opening-query is provided at block 2310, and a response is polled at blocks 1916 and 1918 and if no response is received then a predetermined default action is performed at block 1924 otherwise a command in accordance with the response is performed by the automatic door controller 114 at block 1920.

In method 2300, in response to the query counter being initialized at block 1912, the query counter is decremented by 1 at block 2308, a door-opening-query is provided at block 2310 and a timer is started at block 1916. An example of the door-opening-query is "A person is at the front door. Do you want to open the door?" If a response to the door-opening-query is received within the time limit at block 1918, in some implementations, an operation in accordance with the response is performed by the door at block 2314. For example of block 2314, if the response is "YES" to a query of "A person is at the front door. Do you want to open the door?" then the door is instructed to perform an open operation.

In some implementations the only recognized responses are YES", "OPEN", OR "NO". The response can be provided in a number of manners, such as speech recognition or receiving a signal from a hand held controller. In some implementations in which security of the facilities in which the door is located is an issue, the response to the door-opening-query is performed in accordance with either method 300 or method 400 in which the response is evaluated for authority of the operator from which the response originated and the response is performed in accordance with the authority of the operator from which the response originated. If a response to the door-opening-query is not received within the time limit at block 1918, the query counter is evaluated in comparison to zero. If the query counter is zero, the predetermined default action is performed at block 1924. If the query counter is not zero, the method 2400 continues with decrementing the query counter by 1 at block 2308.

In summary of a particular implementation of method 2400, when a person is detected on the exterior side of an exterior door, at block 2302, if the door opening query parameter is determined to be set to true at block 2304, an opening query is announced at block 2310. An example of an opening query is "A person is at the front door. Do you want to open the door?". After a specified period of time if a response is not detected at block 1918, the opening query is repeated at block 1914. After the second specified period of time if a response is not detected at block 1918, default action is repeated at block 1924, which can be stop (halt) the door movement, open the door, lock the door, unlock the door or close the door.

Method 2400 provides a manner of controlling a door that reduces physical danger and in some situations provides an added aspect of security.

Hardware and Operating Environment

Figure 25:
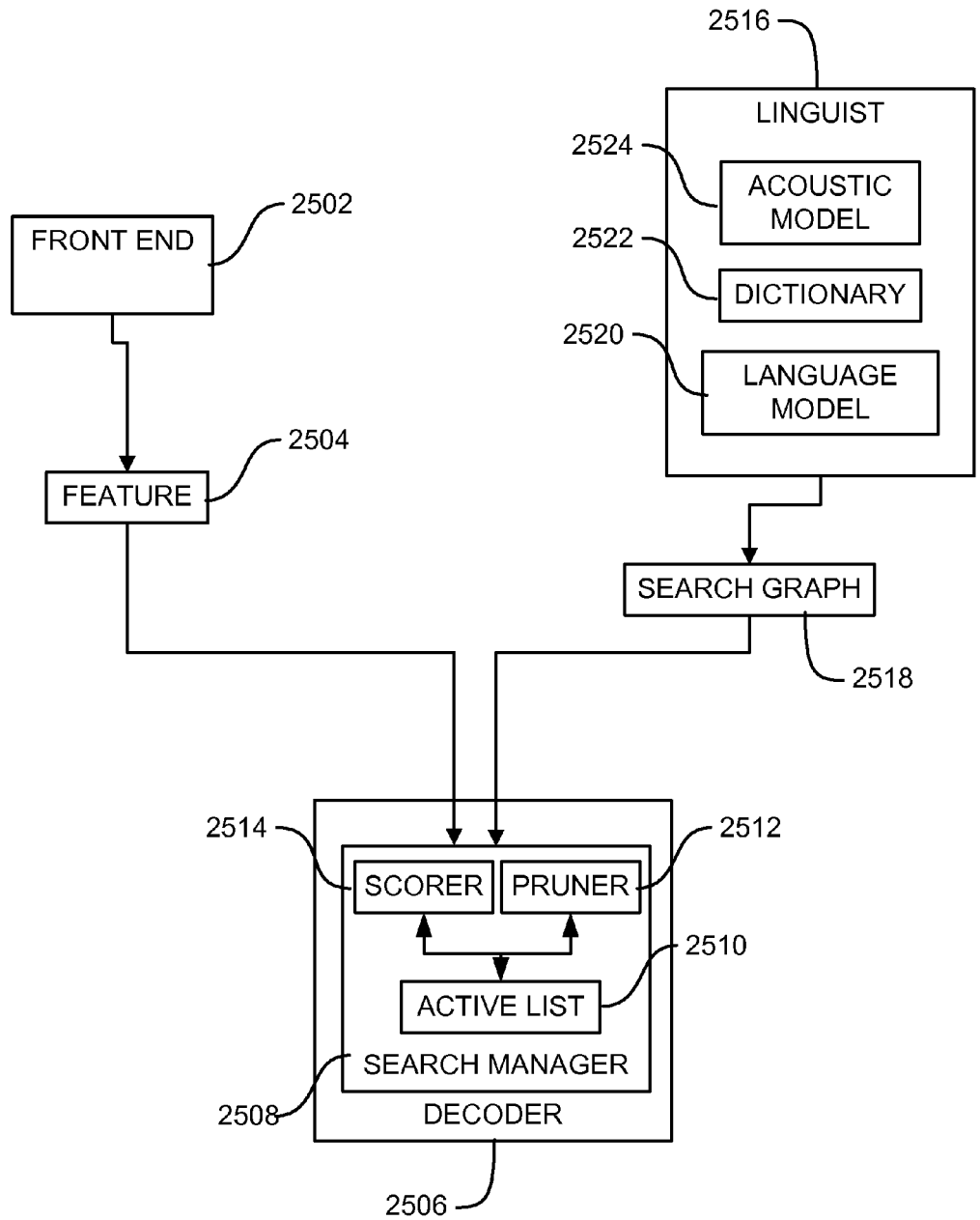
FIG. 25 is a block diagram of a voice-recognition engine, according to an implementation.

FIG. 25 is a block diagram of a voice-recognition engine 2500, according to an implementation. The voice-recognition engine 2500 includes a frontend component 2502 parameterizes an input signal (e.g., audio) into a sequence of output features 2504. The frontend component 2502 includes one or more parallel chains of replaceable communicating signal processing modules called data-processors (not shown). Supporting multiple chains of data-processors of the front-end 2502 permits simultaneous computation of different types of parameters from the same or different input signals. The simultaneous computation enables simultaneous decoding using different parameter types, and even parameter types derived from non-speech signals such as video.

Each data-processor in the frontend component 2502 provides an input and an output that can be connected to another data-processor of the front-end 2502, permitting arbitrarily long sequences of chains of data-processors. The inputs and outputs of each data-processor of the front-end 2502 are generic data objects that encapsulate processed input data as well as markers that indicate data classification events such as end-point detection. The last data-processor of the front-end 2502 in each chain produces a data object composed of parameterized signals (e.g. features 2504) to be used by a decoder component 2506.

The voice-recognition engine 2500 produces parallel sequences of features 2502. The voice-recognition engine 2500 allows for an arbitrary number of parallel streams.

Communication between blocks follows a pull design. With a pull design, a data-processor of the front-end 2502 requests input from an earlier module only when needed, as opposed to the more conventional push design, where a module propagates its output to the succeeding module as soon as the output is generated. This pull design enables the processors to perform buffering, allowing operators to look forwards or backwards in time.

The ability to look forwards or backwards in time not only permits the decoder component 2506 to perform frame-synchronous Viterbi searches, but also allows the decoder component 2506 to perform other types of searches such as depth-first and A*.

Within the generic frontend component 2502 framework, the voice-recognition engine 2500 provides a suite of data-processors of the front-end 2502 that implement conventional signal processing techniques. These implementations include support for the following: reading from a variety of input formats for batch mode operation, reading from the system audio input device for live mode operation, preemphasis, windowing with a raised cosine transform (e.g., Hamming and Hanning windows), discrete fourier transform (FFT), mel frequency filtering, bark frequency warping, discrete cosine transform (DCT), linear predictive encoding (LPC), end pointing, cepstral mean normalization (CMN), mel-cepstra frequency coefficient extraction (MFCC), and perceptual linear prediction coefficient extraction (PLP).

The voice-recognition engine 2500 includes a search-manager component 2508 generates active-lists 2510 from currently active tokens in the search trellis by pruning using a pluggable pruner component 2512. A pruner component 2512 can perform relative and/or absolute beam pruning. The implementation of the pruner component 2512 is greatly simplified by the garbage collector of a Java platform. With garbage collection, the pruner component 2512 prunes a complete path by merely removing the terminal token of the path from the activelist 2510. The act of removing the terminal token identifies the token and any unshared tokens for that path as unused, allowing the garbage collector to reclaim the associated memory.

The search-manager component 2508 sub-framework also includes a scorer component 2514, a pluggable state probability estimation module that provides state output density values on demand. When the Search-manager component 2508 requests a score for a given state at a given time, the scorer component 2514 accesses the feature vector for that time and performs the mathematical operations to compute the score. In the case of parallel decoding using parallel acoustic models, the scorer component 2514 matches the acoustic model set to be used against the feature type.

The scorer component 2514 retains all information pertaining to the state output densities. Thus, the search-manager component 2508 need not store data indicating whether the scoring is done with continuous, semi-continuous or discrete hidden Markov models (HMMs). Furthermore, the probability density function of each HMM state is isolated in the same fashion. Any heuristic algorithms incorporated into the scoring procedure for speeding the scorer component 2514 can also be performed locally within the scorer component 2514. In addition, the scorer component 2514 can take advantage of multiple processors if they are available.

The voice-recognition engine 2500 includes a linguist component 2516 generates a search-graph 2518 that is used by the decoder component 2506 during the search, while at the same time hiding the complexities involved in generating a graph. The linguist component 2516 is a pluggable module, allowing people to dynamically configure the system with different linguist components 2516.

A typical linguist component 2516 constructs the search-graph 2518 using the language structure as represented by a given language-model 2520 and the topological structure of the acoustic-model 2524 (HMMs for the basic sound units used by the system). The linguist component 2516 may also use a dictionary 2522 (typically a pronunciation lexicon) to map words from the language-model 2520 into sequences of acoustic-model 2524 elements. When generating the search-graph 2518, the linguist component 2516 may also incorporate sub-word units with contexts of arbitrary length.

The graph is a directed graph in which each node, called a search state, represents either an emitting or a non-emitting state. Emitting states can be scored against incoming acoustic features while non-emitting states are generally used to represent higher-level linguistic constructs such as words and phonemes that are not directly scored against the incoming features 2502. The arcs between states represent the possible state transitions, each of which has a probability representing the likelihood of transitioning along the arc.

By allowing different implementations of the linguist component 2516 to be plugged in at runtime, the voice-recognition engine 2500 permits individuals to provide different configurations for different system and recognition requirements. For instance, a simple numerical digits recognition application might use a simple linguist component 2516 that keeps the search space entirely in memory. On the other hand, a dictation application with a 100K word vocabulary might use a sophisticated linguist component 2516 that keeps only a small portion of the potential search space in memory at a time.

The linguist component 2516 itself includes of three pluggable components: a language-model 2520, a dictionary 2522, and an acoustic-model 2524, which are described in the following sections.

The language-model 2520 module of the linguist component 2516 provides word-level language structure, which can be represented by any number of pluggable implementations. These implementations typically fall into one of two categories: graph-driven grammars and stochastic N-Gram models. The graph-driven grammar represents a directed word graph where each node represents a single word and each arc represents the probability of a word transition taking place. The stochastic N-Gram models provide probabilities for words given the observation of the previous n-1 words.

The dictionary 2522 provides pronunciations for words found in the language-model 2520. The pronunciations break words into sequences of sub-word units found in the acoustic-model 2524. The dictionary 2522 interface also supports the classification of words and allows for a single word to be in multiple classes. The various implementations optimize for usage patterns based on the size of the active vocabulary. For example, one implementation will load the entire vocabulary at system initialization time, whereas another implementation will only obtain pronunciations on demand.

The acoustic-model 2524 module provides a mapping between a unit of speech and an HMM that can be scored against incoming features 2502 provided by the frontend component 2502. As with other systems, the mapping may also take contextual and word position information into account. For example, in the case of triphones, the context represents the single phonemes to the left and right of the given phoneme, and the word position represents whether the triphone is at the beginning, middle, or end of a word (or is a word itself). The contextual definition is not fixed by the voice-recognition engine 2500, allowing for the definition of the acoustic-model 2524 that contain allophones as well as the acoustic-model 2524 whose contexts do not need to be adjacent to the unit.

Typically, the linguist component 2516 breaks each word in the active vocabulary into a sequence of context-dependent sub-word units. The linguist component 2516 then passes the units and their contexts to the acoustic-model 2524, retrieving the HMM graphs associated with those units. The linguist component 2516 then uses these HMM graphs in conjunction with the language-model 2520 construct the search-graph 2518.

The HMM is a directed graph of objects. In this graph, each node corresponds to an HMM state and each arc represents the probability of transitioning from one state to another in the HMM. By representing the HMM as a directed graph of objects instead of a fixed structure, an implementation of the acoustic-model 2524 can easily supply HMMs with different topologies. For example, the acoustic-model 2524 interfaces do not restrict the HMMs in terms of the number of states, the number or transitions out of any state, or the direction of a transition (forward or backward). Furthermore, the voice-recognition engine 2500 allows the number of states in an HMM to vary from one unit to another in the same acoustic-model 2524.

Each HMM state is capable of producing a score from an observed feature. The actual code for computing the score is done by the HMM state itself, thus hiding its implementation from the rest of the system, even permitting differing probability density functions to be used per HMM state. The acoustic-model 2524 also allows sharing of various components at all levels. That is, the components that make up a particular HMM state such as Gaussian mixtures, transition matrices, and mixture weights can be shared by any of the HMM states to a very fine degree.

Individuals can configure the voice-recognition engine 2500 with different implementations of the acoustic-model 2524 based upon their needs. The voice-recognition engine 2500 provides a single acoustic-model 2524 implementation that is capable of loading and using acoustic models.

Even though the linguist component 2516 may be implemented in very different ways and the topologies of the search spaces generated by these, the linguist component 2516 can vary greatly, the search spaces are all represented as a search-graph 2518. The search-graph 2518 is the primary data structure used during the decoding process.

FIG. 26 is a block diagram of a voice-recognition apparatus 2600 to control an actuated-door, according to an implementation. The voice-recognition apparatus 2600 is one implementation of voice-recognition unit 604 in FIG. 6. The voice-recognition apparatus 2600 receives input from any one of a number of input mediums, such as audio, and therefrom controls an actuated-door. The voice-recognition apparatus 2600 can fit inside the housing of conventional actuated-door and can communicate with and control conventional actuated-door using the conventional existing electrical circuitry of actuated-door. The voice-recognition apparatus 2600 helps improve control of the actuated-door by receiving input from any one of a number of input mediums, such as audio. In the example of audio, the voice-recognition apparatus 2600 improves the ease and convenience with which an operator can control the actuated-door by providing a voice interface to the actuated-door. In general, the voice-recognition apparatus 2600 improves the ease and convenience with which an operator can control the actuated-door by providing a command interface to the actuated-door other than a handheld control device, such as the handheld control device 3226 shown in FIG. 32.

Voice-recognition apparatus 2600 includes a microcontroller, processor or microprocessor 2602, such as a RSC 6502 microcontroller. The 6502 is an 8-bit processor with a 16-bit address bus. The internal logic runs at the same speed as the external clock rate, and having clock speeds typically in the neighborhood of 1 or 2 MHz. The 6502 has a relatively simplistic state machine implemented by combinatorial (clockless) logic. A two phase clock (supplying two synchronizations per cycle) can thereby control the whole machine-cycle directly. The 6502 microcontroller is not sequenced by a microcode read-only-memory but uses a programmable logic array for instruction decoding and sequencing. Like most typical eight-bit microprocessors, the 6502 microcontroller does some limited overlapping of fetching and execution. The low clock frequency moderates the speed requirement of memory and peripherals attached to the 6502 microcontroller, as only about 50% of the clock cycle is available for memory access (due to the asynchronous design, this percentage varies strongly among chip versions). The 6502 microcontroller is minimalistically engineered and efficiently manufactured and therefore inexpensive. Like its precursor, the Motorola 6800 (but unlike Intel 8080 and similar microprocessors) the 6502 microcontroller has very few registers. The registers of the 6502 microcontroller include one 8-bit accumulator register (A), two 8-bit index registers (X and Y), an 8-bit processor status register (P), an 8-bit stack pointer (S), and a 16-bit program counter (PC). The subroutine call/scratchpad stack's address space is hardwired to memory page $01, i.e. the address range $0100-$01FF (256-511). Software access to the stack is performed via four implied addressing mode instructions whose functions are to push or pop (pull) the accumulator or the processor status register. The same stack is also used for subroutine calls via the JSR (Jump to Subroutine) and RTS (Return from Subroutine) instructions, and for interrupt handling. The 6502 microcontroller uses the index and stack registers effectively with several addressing modes, including a fast "direct page" or "zero page" mode, similar to that found on the PDP-8, that accessed memory locations from address 0 to 255 with a single 8-bit address (saving the cycle normally required to fetch the high-order byte of the address) code for the 6502 use the zero page much as code for other processors would have used registers. Addressing modes also include implied (1 byte instructions); absolute (3 bytes); indexed absolute (3 bytes); indexed zero-page (2 bytes); relative (2 bytes); accumulator (1); indirect,x and indirect,y (2); and immediate (2). Absolute mode is a general-purpose mode. Branch instructions use a signed 8-bit offset relative to the instruction after the branch; the numerical range −128 . . . 127 therefore translates to 128 bytes backward and 127 bytes forward from the instruction following the branch (which is 126 bytes backward and 129 bytes forward from the start of the branch instruction). Accumulator mode uses the accumulator as an effective address, and did not need any operand data. Immediate mode uses an 8-bit literal operand. The indirect modes are useful for array processing and other looping. With the 5/6 cycle "(indirect), y" mode, the 8-bit Y register is added to a 16-bit base address in zero page, located by a single byte following the opcode. As the resulting address could be anywhere in the 16-bit memory range, the Y register is a true index register, as opposed to the 6800, which had one 16-bit address register. Incrementing the index register to walk the array byte-wise took only two additional cycles. With the less frequently used "(indirect,x)" mode the effective address for the operation is found at the zero page address formed by adding the second byte of the instruction to the contents of the X register. Using the indexed modes, the zero page effectively acted as a set of 128 additional (though very slow) address registers. The 6502 also includes a set of binary coded decimal (BCD) instructions, a feature normally implemented in software. Placing the CPU into BCD allowed numbers to be manipulated in base-10, with a set of conversion instructions to convert between base-10 and binary (base-2). For instance, with the "D" flag set, 99+1 would result in 00 and the carry flag being set. These instructions remove the need to convert numbers for display in the BASIC interpreter itself. However, this feature means other useful instructions can not be implemented easily, and is sometimes removed to make room for custom instructions. The RSC 6502 microcontroller is merely one example of microcontroller, processor or microprocessor that can be used in the voice-recognition apparatus 2600. The RSC 6502 microcontroller has been manufactured by Conexant Systems at 4000 MacArthur Boulevard, Newport Beach, Calif.

The microcontroller, processor or microprocessor 2602 is operably coupled to a voice-recognition apparatus 2600 includes at least one input device, such as one of the devices shown in FIG. 5 including a keyboard, a synaptic reader, and/or a microphone 2604 such as shown in FIG. 26.

And some implementations, the microcontroller, processor or microprocessor 2602 is operably coupled to a program/run switch 2606 that is set to indicate the mode that the microcontroller, processor or microprocessor 2602 is operating. When the microcontroller, processor or microprocessor 2602 is being programmed, the program/run switch 2606 is set to program. When the microcontroller, processor or microprocessor 2602 is being run, the program/run switch 2606 is set to run.

The microcontroller, processor or microprocessor 2602 is operably coupled to a power input 2606.

In some implementations, the microcontroller, processor or microprocessor 2602 is operably coupled to a memory 2610 that stores data and programs. In some implementations, the microcontroller, processor or microprocessor 2602 is operably coupled to a digital-to-analog (DAC) converter that generates DAC output 2612. In some implementations, the microcontroller, processor or microprocessor 2602 is operably coupled to an audio speaker 2614.

In other implementations, the microcontroller, processor or microprocessor 2602 includes memory. In some implementations in which the microcontroller, processor or microprocessor 2602 includes memory, a microprocessor/microcontroller/processor provides an economical wireless voice control and communications system. The microprocessor/microcontroller/processor incorporates voice recognition, infrared (IR) and radio frequency (RF) wireless protocols including Zigbee and Bluetooth wireless protocols with positional awareness and a complex programmable logic device (CPLD) interface. The microprocessor/microcontroller/processor communicates with and controls multi-sensory controls for products from microwaves and washing machines to spacecraft. The microprocessor/microcontroller/processors are selected from both 16-bit and 32-bit devices. The microprocessor/microcontroller/processor having 16-bit radio-frequency (RF) interfaces are well-suited for applications such as wireless keyboard/mouse, wireless voice-over-IP (VoIP), remote controls, wireless gaming accessories, home and building automation applications such as alarm and security systems, automatic meter reading systems, active radio-frequency identification (RFID) systems and other monitoring and control systems. Microprocessor/microcontroller/processors having 32-bit word-length include high performance integrated peripherals designed for real-time control applications. An optimized core of the microprocessor/microcontroller/processor performs multiple complex control algorithms at speeds necessary for demanding control applications. Integrated peripherals such as a 16-channel, 12-bit analog-to-digital conversion (ADC) running at up to 12.5 megasamples per second and high resolution pulse-width modulation (PWM) modules with 150 picosecond resolution provide sufficient bandwidth for communication with analog devices. Further including the serial peripheral interface (SPI), universal asynchronous receiver/transmitter (UART), inter-IC (I2C), campus area network (CAN), and multi-channel buffered serial port (McBSP) communication peripherals provides device control on a single microprocessor/microcontroller/processor. Applications include appliances, alternating current/direct current (AC/DC), direct current/alternating (DC/AC) and direct current/direct current (DC/DC) digital power supplies, solar inverters, digital motor control, and power line communication.

Figure 34:
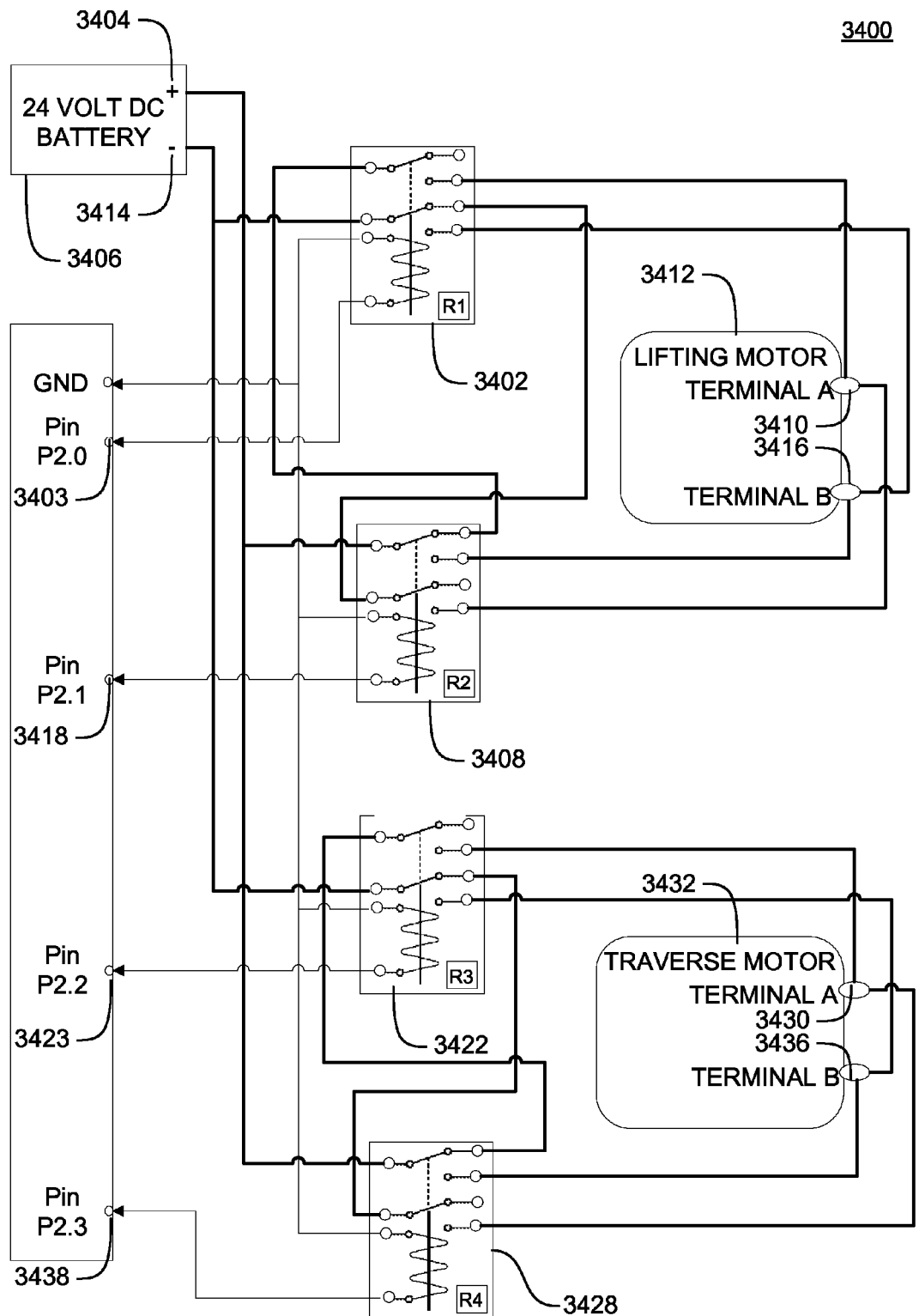
FIG. 34 is a block diagram of a device-controller of an automatic door, according to an implementation using DPTD relays.

The microcontroller, processor or microprocessor 2602 is operably coupled to a lift device-controller 2616 that can perform action 1504 in FIG. 15, actions 1602, 1604 and 1606 in FIG. 16, actions 1702, 1704 and 1706 in FIG. 17 and action 1802 in FIG. 18. The lift device-controller 2616 is electrically coupled to at least one actuated-door 2618. Examples of the actuated-door 2618 include the automatic electric sliding door 3200 and the automatic electric swing door 3300 in FIG. 33. Device-controller 3400 in FIG. 34 is one implementation of the lift device-controller 2616 for a two dimensional automatic door, such as the automatic electric sliding door 3200 in FIG. 32, that implements a double-pole-double-throw (DPDT) relay for each direction of movement of the two dimensional automatic door.

In some implementations, the microcontroller, processor or microprocessor 2602 is operably coupled to a serial port 2620 through which program instructions can be loaded onto the microcontroller, processor or microprocessor 2602.

In some implementations, the microcontroller, processor or microprocessor 2602 is operably coupled to a nonvolatile memory that stores a voice-recognition engine, such as voice-recognition engine 2500 in FIG. 25. In the implementation shown in FIG. 26, the nonvolatile memory is electrically erasable programmable read only memory (EEPROM) 2622. The voice-recognition engine 2622 includes a predefined set of functions that are called during voice-recognition operations.

Figure 27:
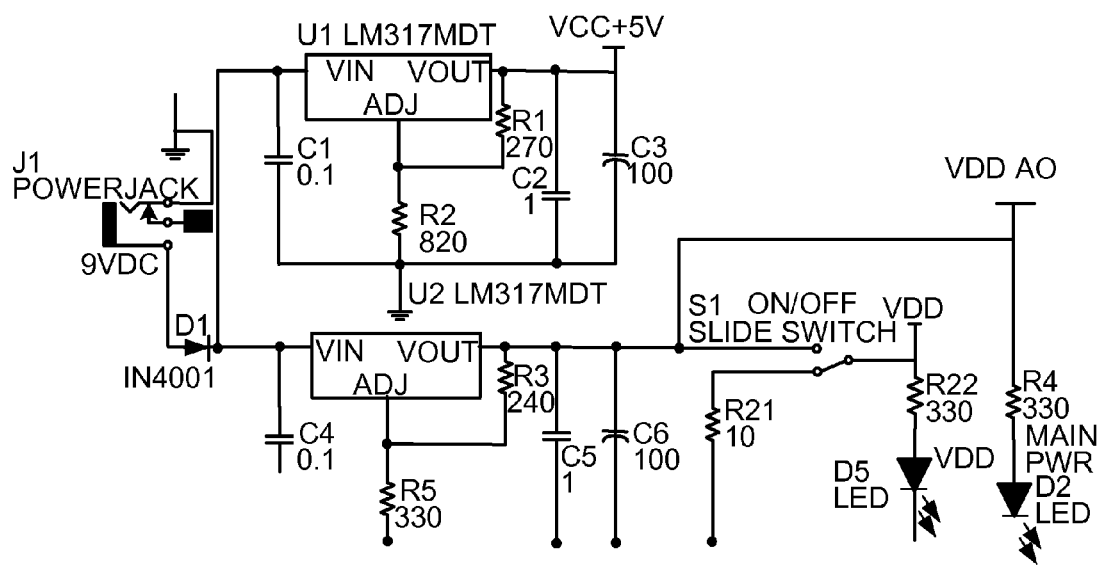
FIG. 27 is an electrical schematic diagram of an electrical circuit useful in the implementation of the voice-recognition apparatus in FIG. 26, according to an implementation.

FIG. 27 is an electrical schematic diagram of an electrical circuit useful in the implementation of the voice-recognition apparatus 2600 in FIG. 26, according to an implementation.

Figure 28:
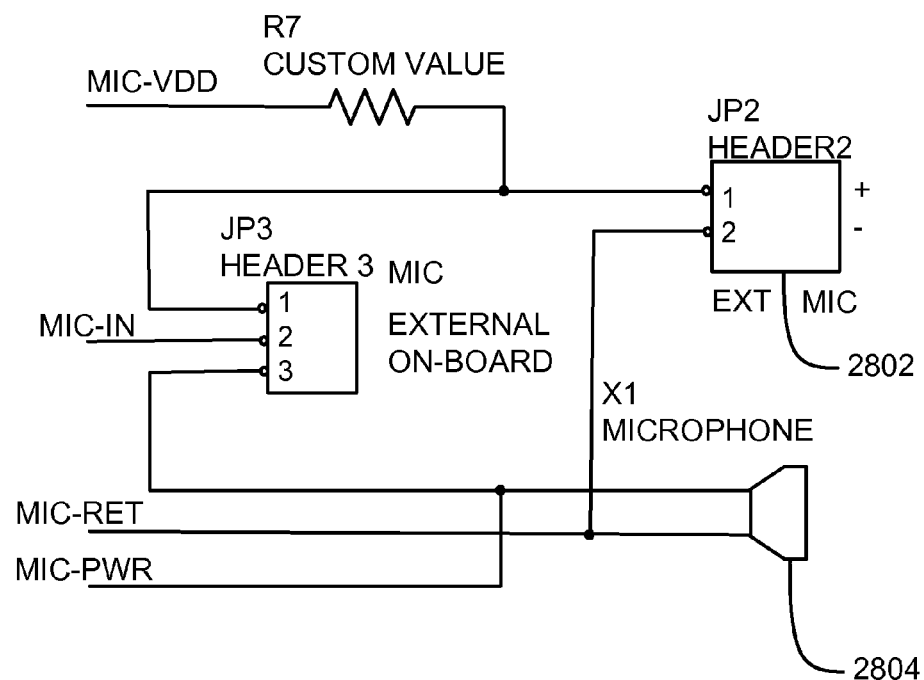
FIG. 28 is an electrical schematic diagram of an internal microphone circuit for an actuated-door, according to an implementation.

FIG. 28 is an electrical schematic diagram of an internal microphone circuit 2800 for a voice actuated-door, according to an implementation. Microphone circuit 2800 is one implementation of the microphone 2604 in the voice-recognition apparatus 2600 in FIG. 26. In microphone circuit 2800, when J1 and J2 are jumped, an external microphone that is engaged in an external jack 2802 is used; when J1 and J2 are not jumped, an internal microphone 2804 is used.

FIG. 29 is an electrical schematic diagram of a voice-recognition apparatus 2900 to control an actuated-door, according to an implementation. The voice-recognition apparatus 2900 is one implementation of voice-recognition unit 604 in FIG. 6. The voice-recognition apparatus 2900 receives input from any one of a number of input mediums, including audio, and therefrom controls an actuated-door. The voice-recognition apparatus 2900 can fit inside the housing of conventional actuated-door and can communicate with and control the conventional actuated-door using the conventional existing electrical circuitry of actuated-door. The voice-recognition apparatus 2900 helps improve control of the actuated-door by receiving input from any one of a number of input mediums, including audio. In the example of audio, the voice-recognition apparatus 2900 improves the ease and convenience with which an operator can control the actuated-door by providing a voice interface to the actuated-door. In general, the voice-recognition apparatus 2900 improves the ease and convenience with which an operator can control the actuated-door by providing a command interface to the actuated-door other than a handheld control device, such as the handheld control device 3226 shown in FIG. 32.

Voice-recognition apparatus 2900 includes a microcontroller, processor or microprocessor 2902, such as a RSC 6502 microcontroller. The microcontroller, processor or microprocessor 2902 includes non-volatile memory (not shown) such as Flash memory that can be electrically erased and reprogrammed. The RSC 6502 microcontroller is merely one example of a microcontroller, processor or microprocessor that can be used in the voice-recognition apparatus 2900. The RSC 6502 microcontroller has been manufactured by Conexant Systems at 4000 MacArthur Boulevard, Newport Beach, Calif.

The microcontroller, processor or microprocessor 2902 is operably coupled to at least one input device (not shown), such as one of the devices shown in FIG. 5 including a keyboard, a synaptic reader, and/or a microphone. And some implementations, the microcontroller, processor or microprocessor 2902 is operably coupled to a program/run switch (not shown) that is set to indicate the mode that the microcontroller, processor or microprocessor 2902 is operating.

In some implementations, the microcontroller, processor or microprocessor 2902 is operably coupled to another memory (not shown) that stores data and programs. In some implementations, the microcontroller, processor or microprocessor 2902 is operably coupled to a digital-to-analog (DAC) converter that generates DAC output (not shown). In some implementations, the microcontroller, processor or microprocessor 2902 is operably coupled to an audio speaker (not shown).

In some implementations, the microprocessor/microcontroller/processor incorporates infrared (IR) and radio frequency (RF) wireless protocols including Zigbee and Bluetooth wireless protocols with positional awareness and a complex programmable logic device (CPLD) interface. The microprocessor/microcontroller/processor communicates with and controls multi-sensory controls for products from microwaves and washing machines to spacecraft. The microprocessor/microcontroller/processor is selected from both 16-bit and 32-bit devices. The microprocessor/microcontroller/processor having 16-bit radio-frequency (RF) interfaces are well-suited for applications such as wireless keyboard/mouse, wireless voice-over-IP (VoIP), remote controls, wireless gaming accessories, home and building automation applications such as alarm and security systems, automatic meter reading systems, active radio-frequency identification (RFID) systems and other monitoring and control systems. Microprocessor/microcontroller/processors having 32-bit word-length include high performance integrated peripherals designed for real-time control applications. An optimized core of the microprocessor/microcontroller/processor performs multiple complex control algorithms at speeds necessary for demanding control applications. Integrated peripherals such as a 16-channel, 12-bit analog-to-digital conversion (ADC) running at up to 12.5 megasamples per second and high resolution pulse-width modulation (PWM) modules with 150 picosecond resolution provide sufficient bandwidth for communication with analog devices. Further including the serial peripheral interface (SPI), universal asynchronous receiver/transmitter (UART), inter-IC (I2C), campus area network (CAN), and multi-channel buffered serial port (McBSP) communication peripherals provides device control on a single microprocessor/microcontroller/processor. Applications include appliances, alternating current/direct current (AC/DC), direct current/alternating (DC/AC) and direct current/direct current (DC/DC) digital power supplies, solar inverters, digital motor control, and power line communication.

The microcontroller, processor or microprocessor 2902 is operably coupled to a lift device-controller (not shown) that can perform action 1504 in FIG. 15, actions 1602, 1604 and 1606 in FIG. 16, actions 1702, 1704 and 1706 in FIG. 17 and action 1802 in FIG. 18. The lift device-controller is electrically coupled to at least one actuated-door (not shown). Examples of the actuated-door (not shown) include the automatic electric sliding door 3200 in FIG. 32 and the automatic electric swing door 3300 in FIG. 33. Device-controller 3400 in FIG. 34 is one implementation of the lift device-controller 2916 for a two dimensional automatic door, such as the automatic electric sliding door 3200 in FIG. 32, that implements a double-pole-double-throw (DPDT) relay for each direction of movement of the two dimensional automatic door.

In some implementations, the microcontroller, processor or microprocessor 2902 is operably coupled to a serial port 2904 through which program instructions can be loaded onto the microcontroller, processor or microprocessor 2902.

In some implementations, the microcontroller, processor or microprocessor 2902 is operably coupled to a nonvolatile memory that stores a voice-recognition engine, such as voice-recognition engine 2500 in FIG. 25. In the implementation shown in FIG. 29, the nonvolatile memory is electrically erasable programmable read only memory (EEPROM) 2906. The voice-recognition engine 2906 includes a predefined set of functions that are called during voice-recognition operations.

Figure 30:
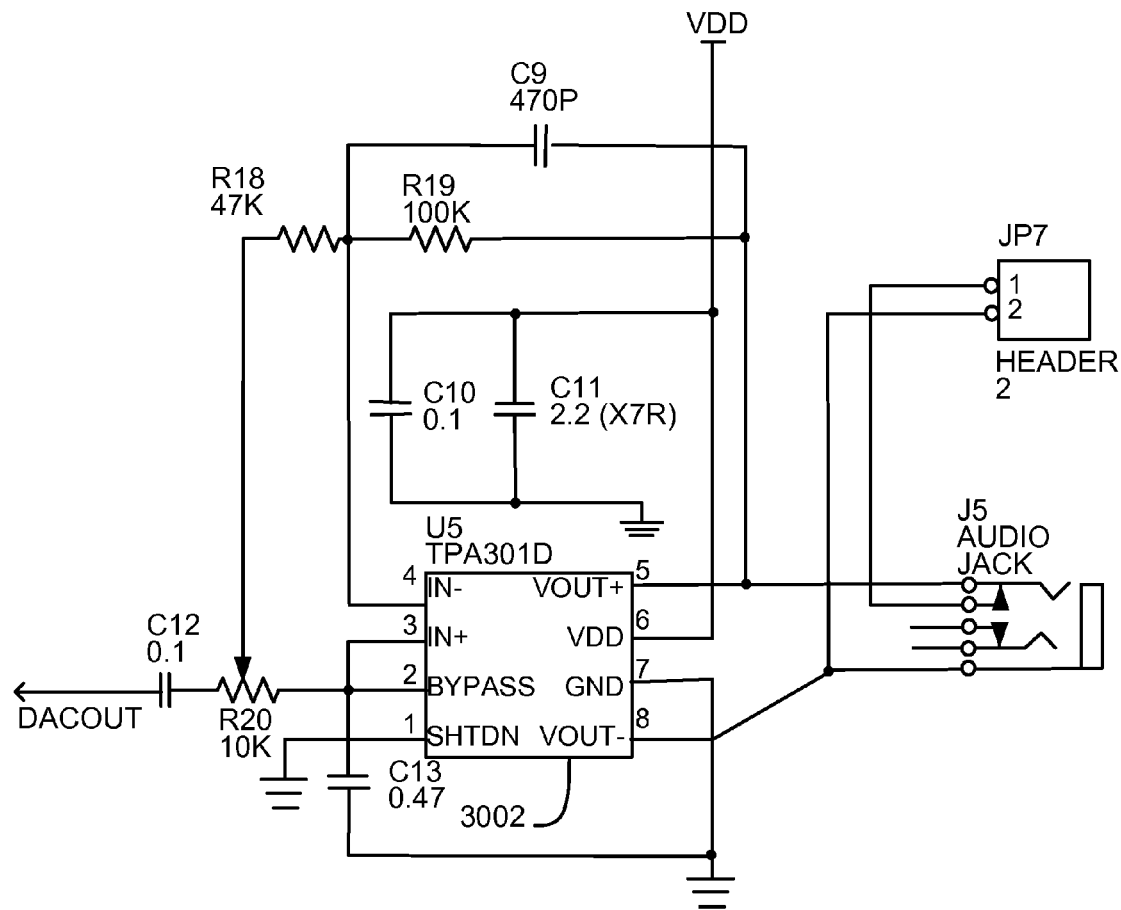
FIG. 30 is an electrical schematic diagram of a speaker circuit for an actuated-door, according to an implementation.

FIG. 30 is an electrical schematic diagram of a speaker circuit 3000 for a voice actuated-door, according to an implementation. Speaker circuit 3000 is one implementation of the speaker 2614 in the voice-recognition apparatus 2600 in FIG. 26. Speaker circuit 3000 include a microprocessor 3002 that includes an amplifier and a digital-to-analog (D/A) converter.

FIG. 31 is a block diagram of a computer environment 3100 that controls automatic doors from audio voice commands, in accordance with an implementation. Implementations are described in terms of a computer executing computer-executable instructions. However, some implementations can be implemented entirely in computer hardware in which the computer-executable instructions are implemented in read-only memory. Some implementations can also be implemented in client/server computing environments where remote devices that perform tasks are linked through a communications network. Program modules can be located in both local and remote memory storage devices in a distributed computing environment.

The computer environment 3100 includes a computation resource 3102 capable of implementing the processes described herein. It will be appreciated that other devices can alternatively used that include more components, or fewer components, than those illustrated in FIG. 31.

The computer environment 3100 can function as one or more of the control segments, via implementation of the methods in FIGS. 9-18, respectively, as one or more computer program modules.

The illustrated operating environment 3100 is only one example of a suitable operating environment, and the example described with reference to FIG. 31 is not intended to suggest any limitation as to the scope of use or functionality of the implementations of this disclosure. Other well-known computing systems, environments, and/or configurations can be suitable for implementation and/or application of the subject matter disclosed herein.

The computation resource 3102 includes one or more processors or processing units 3104, a system memory 3106, and a bus 3108 that couples various system components including the system memory 3106 to processor(s) 3104 and other elements in the environment 3100. The bus 3108 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

In some implementations, the processor unit 3104 includes the various apparatus and systems described in this application that provide control of the automatic electric sliding door 3200 and the automatic electric swing door 3300 from various stimulus such as audio voice input. Examples of the various apparatus and systems that are included in the processor unit 3104 include the command interface unit 102, processor 106 and/or device controller 110 in FIG. 1 and FIG. 2, the keyboard data receiver 502, voice data receiver 504 and/or a synaptic data receiver 506 in FIG. 5, and/or voice-recognition unit 604 in FIG. 6, the device configuration user interface 702 and/or the modifiable logic circuit 704 in FIG. 7, the voice-recognition engine 2500 in FIG. 25, and other tangible systems that perform methods 900, 1000, 1100, 1200, 1300, 1400, 1500, 1600, 1700 and/or 1800.

The system memory 3106 includes nonvolatile read-only memory (ROM) 3110 and random access memory (RAM) 3112, which can or can not include volatile memory elements. A basic input/output system (BIOS) 3114, containing the elementary routines that help to transfer information between elements within computation resource 3102 and with external items, typically invoked into operating memory during start-up, is stored in ROM 3110.

The computation resource 3102 further can include a non-volatile read/write memory 3116, represented in FIG. 31 as a hard disk drive, coupled to bus 3108 via a data media interface 3117 (e.g., a SCSI, ATA, or other type of interface); a magnetic disk drive (not shown) for reading from, and/or writing to, a removable magnetic disk 3120 and an optical disk drive (not shown) for reading from, and/or writing to, a removable optical disk 3126 such as a CD, DVD, or other optical media.

The non-volatile read/write memory 3116 and associated computer-readable media provide nonvolatile storage of computer-readable instructions, data structures, program modules and other data for the computation resource 3102. Although the exemplary environment 3100 is described herein as employing a non-volatile read/write memory 3116, a removable magnetic disk 3120 and a removable optical disk 3126, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 3116, magnetic disk 3120, optical disk 3126, ROM 3110, or RAM 3112, including an operating system 3130, one or more application programs 3132, other program modules 3134 and program data 3136. Examples of computer operating systems conventionally employed include the NUCLEUS® operating system, the LINUX® operating system, and others, for example, providing capability for supporting application programs 3132 using, for example, code modules written in the C++® computer programming language.

A user can enter commands and information into computation resource 3102 through input devices such as input media 3138 (e.g., keyboard/keypad, tactile input or pointing device, mouse, foot-operated switching apparatus, joystick, touchscreen or touchpad, microphone, antenna etc.). Such input devices 3138 are coupled to the processing unit 3104 through a conventional input/output interface 3142 that is, in turn, coupled to the system bus. A monitor 3150 or other type of display device is also coupled to the system bus 3108 via an interface, such as a video adapter 3152.

The computation resource 3102 can include capability for operating in a networked environment using logical connections to one or more remote computers, such as a remote computer 3160. The remote computer 3160 can be a personal computer, a server, a router, a network PC, a peer device or other common network node, and typically includes many or all of the elements described above relative to the computation resource 3102. In a networked environment, program modules depicted relative to the computation resource 3102, or portions thereof, can be stored in a remote memory storage device such as can be associated with the remote computer 3160. By way of example, remote application programs 3162 reside on a memory device of the remote computer 3160. The logical connections represented in FIG. 31 can include interface capabilities, e.g., such as interface capabilities in FIG. 5, a storage area network (SAN, not illustrated in FIG. 31), local area network (LAN) 3172 and/or a wide area network (WAN) 3174, but can also include other networks.

Such networking environments are commonplace in modern computer systems, and in association with intranets and the Internet. In certain implementations, the computation resource 3102 executes an Internet Web browser program (which can optionally be integrated into the operating system 3130), such as the "Internet Explorer®" Web browser manufactured and distributed by the Microsoft Corporation of Redmond, Wash.

When used in a LAN-coupled environment, the computation resource 3102 communicates with or through the local area network 3172 via a network interface or adapter 3176. When used in a WAN-coupled environment, the computation resource 3102 typically includes interfaces, such as a modem 3178, or other apparatus, for establishing communications with or through the WAN 3174, such as the Internet. The modem 3178, which can be internal or external, is coupled to the system bus 3108 via a serial port interface.

In a networked environment, program modules depicted relative to the computation resource 3102, or portions thereof, can be stored in remote memory apparatus. It will be appreciated that the network connections shown are exemplary, and other means of establishing a communications link between various computer systems and elements can be used.

A user of a computer can operate in a networked environment using logical connections to one or more remote computers, such as a remote computer 3160, which can be a personal computer, a server, a router, a network PC, a peer device or other common network node. Typically, a remote computer 3160 includes many or all of the elements described above relative to the computer 3100 of FIG. 31.

The computation resource 3102 typically includes at least some form of computer-readable media. Computer-readable media can be any available media that can be accessed by the computation resource 3102. By way of example, and not limitation, computer-readable media can comprise computer storage media and communication media.

FIG. 32 is a schematic perspective view of an automatic electric sliding door 3200, according to an implementation having two door panels. Two door panels 3202 and 3204 are suspended from a springer 3206 with an air rail on carriage by way of suspensions with rollers and an anti-derailer.

Door panels 3202 and 3204 are activated by way of a drive mechanism 3208. This mechanism can be a cogged belt driven by a cogwheel on a motor with a transmission 3210 and an electromagnetic clutch. Drive mechanism 3208 is a continuous belt and is secured to the door panels 3204 and 3206. The belt travels around a deflection disk 3212 at the end opposite the motor 3210. The automatic electric sliding door 3200 is operated by way of corresponding control box 3215. At the bottom the door panels 3202 and 3204 move in floor-mounted guides 3218 and 3220, respectively.

The automatic electric sliding door 3200 also includes a power supply 3222, a driving cogwheel 3224 and a door lock 3226. Elastic structure 3228 extends around a deflection roller 3230.

In some implementations, the control box 3215 includes the various apparatus and systems described in this application that provide control of the automatic electric sliding door 3200 from various stimulus such as audio voice input. Examples of the various apparatus and systems that are included in the control box 3215 include the command interface unit 102, processor 106 and/or device controller 110 in FIG. 1 and FIG. 2, the keyboard data receiver 502, voice data receiver 504 and/or a synaptic data receiver 506 in FIG. 5, the microphone 602 and or voice-recognition unit 604 in FIG. 6, the device configuration user interface 702 and/or the modifiable logic circuit 704 in FIG. 7, the electrical devices in FIGS. 26-31, and other tangible systems that perform methods 900, 1000, 1100, 1200, 1300, 1400, 1500, 1600, 1700, 1800, 1900, 2000, 2100, 2200, 2300 and 2400.

The apparatus and methods described in FIG. 1-30 can be implemented in a control box of any type and variation of automatic electric sliding door. The automatic electric sliding door 3200 is shown as one example of automatic electric sliding door that can implement the apparatus and methods of FIG. 1-30.

In some implementations, the automatic electric sliding door 3200 includes a handheld control device (not shown) that is electrically coupled to the control box 3215 a line (not shown), the handheld control device providing signals that directs movement of the line 3224 and movement of the control box 3222 along the horizontal support 3210. In some implementations, control initiated from the handheld control device 3226 overrides control initiated from other input means.

Some implementations of the automatic electric sliding door 3200 include a charging unit (not shown) in the control box 3222 to provide power for recharging a battery. The battery can be mounted in the control box 3215. The charging unit is electrically coupled to a power cord having male prongs on the other end from the charging unit that are suitable to plug into a standard residential electrical wall outlet female receptacle.

FIG. 33 is a schematic perspective view of an automatic electric swing door 3300, according to an implementation having one hinged door panel. The automatic electric swing door 3300 includes a swing door 3302 with hinges on its left side and a frame 3304 accommodating the swing door 3302. The automatic electric swing door 3300 also includes a door opener 3306 attached to an upper portion of the frame 3304 by means of screws 3308. The door opener 3306 has an arm 3310 that is pivotally connected to its housing and having a roller 3312 at its free end. Alternatively, the swing door 3302 can contain a door closer motor 3314 and control box (not shown). When swung, the arm 3310 pushes the swing door 3302 through the strike plate 3316. Swing door 3302 also has a handle 3318. The automatic electric swing door 3300 also includes a sensor 3320 attached to the wall 3322 with lens 3324.

In some implementations, the control box 3314 includes the various apparatus and systems described in this application that provide control of the automatic electric swing door 3300 from various stimulus such as audio voice input. Examples of the various apparatus and systems that are included in the control box 3215 include the command interface unit 102, processor 106 and/or device controller 110 in FIG. 1 and FIG. 2, the keyboard data receiver 502, voice data receiver 504 and/or a synaptic data receiver 506 in FIG. 5, the microphone 602 and or voice-recognition unit 604 in FIG. 6, the device configuration user interface 702 and/or the modifiable logic circuit 704 in FIG. 7, the electrical devices in FIGS. 26-31, and other tangible systems that perform methods 900, 1000, 1100, 1200, 1300, 1400, 1500, 1600, 1700, 1800, 1900, 2000, 2100, 2200, 2300 and 2400.

The apparatus and methods described in FIG. 1-30 can be implemented in a control box of any type and variation of automatic swing sliding door. The automatic electric swing door 3300 is shown as one example of automatic electric sliding door that can implement the apparatus and methods of FIG. 1-30.

FIG. 34 is a block diagram of a device-controller 3400 of an automatic door, according to an implementation using DPTD relays. Device-controller 3400 is one implementation of the lift device-controller 2616 in FIG. 26 for a two dimensional automatic door, such as the automatic electric sliding door 3200, that implements a normally-open double-pole-double-throw (DPDT) relay for each direction of movement of the two dimensional automatic door. Two-dimensional movement consists of movement in four directions, hence device-controller 3400 consists of four normally-open DTDT relays. Other implementation of device-controller 3400 that do not have the safety features of device-controller 3400 implement single-pole-single-throw (SPST) relays.

To command movement in a particular direction, the corresponding relay is actuated. To actuate the automatic door in an upward direction, DPDT relay 3402 is actuated by setting voltage "high" (e.g. 3 volts) on pin "P2.0" 3403. When DPDT relay 3402 is actuated, the normally-open DPDT relay 3402 is closed, thereupon a positive electric current will flow from the positive terminal 3404 of the 24 volt DC battery 3406, through DPDT relay 3408, and through DPDT relay 3402 to Terminal A 3410 of lifting motor 3412 and also when DTDT relay 3402 is actuated, a negative electric current will flow from the negative terminal 3414 of the 24 volt DC battery 3406, through DPDT relay 3402 to Terminal B 3416 of lifting motor 3412, thus providing electric current to lifting motor 3412 in a polarity that will retract a line coupled to the lifting motor 3412, thereupon lifting the seat or hammock 3212.

To actuate the automatic door in a downward direction, DPDT relay 3408 is actuated by setting voltage "high" (e.g. 3 volts) on pin "P2.1" 3418. When DPDT relay 3408 is actuated, the normally-open DPDT relay 3408 becomes closed, thereupon a negative electric current will flow from the negative terminal 3414 of the 24 volt DC battery 3406, through DPDT relay 3402, and through DPDT relay 3408 to Terminal A 3410 of lifting motor 3412 and also when DTDT relay 3408 is actuated, a positive electric current will flow from the positive terminal 3404 of the 24 volt DC battery 3406, through DPDT relay 3408 to Terminal B 3416 of lifting motor 3412, thus providing electric current to lifting motor 3412 in a polarity that will extend a line coupled to the lifting motor 3412, thereupon lowering the seat or hammock 3212.

Please note the safety feature in the serial wiring of DTDT relay 3402 and DPDT relay 3408. The safety feature lies in that positive electric current will flow from the positive terminal 3404 of the 24 volt DC battery 3406, through DPDT relay 3408, and through DPDT relay 3402 to Terminal A 3410 of lifting motor 3412 when DPDT relay 3408 is not actuated. Positive electric current will not flow from the positive terminal 3404 of the 24 volt DC battery 3406, through DPDT relay 3408, and through DPDT relay 3402 to Terminal A 3410 of lifting motor 3412 when DPDT relay 3408 is actuated. Therefore, if somehow both DPDT relay 3402 and DPDT relay 3408 are simultaneously actuated, no current will flow to the lifting motor 3412, thus preventing both positive electric current and negative electric from simultaneously flowing to Terminal A 3410 of lifting motor 3412 and preventing both positive electric current and negative electric from simultaneously flowing to Terminal B 3416 of lifting motor 3412.

Other implementations use other power sources in place of the 24 volt DC battery 3406.

To actuate the automatic door lock, DPDT relay 3422 is actuated by setting voltage "high" (e.g. 3 volts) on pin "P2.2" 3423. When DPDT relay 3422 is actuated, the normally-open DPDT relay 3422 is closed, thereupon a positive electric current will flow from the positive terminal 3404 of the 24 volt DC battery 3406, through DPDT relay 3428, and through DPDT relay 3422 to Terminal A 3430 of traversing motor 3432 and also when DTDT relay 3422 is actuated, a negative electric current will flow from the negative terminal 3434 of the 24 volt DC battery 3406, through DPDT relay 3422 to Terminal B 3436 of traversing motor 3432, thus providing electric current to traversing motor 3432 in a polarity that will traverse in a forward direction the line coupled to the traversing motor 3432, thereupon moving the seat or hammock 3212 forward.

To actuate the automatic door to unlock, DPDT relay 3428 is actuated by setting voltage "high" (e.g. 3 volts) on pin "P2.3" 3438. When DPDT relay 3428 is actuated, the normally-open DPDT relay 3428 becomes closed, thereupon a negative electric current will flow from the negative terminal 3434 of the 24 volt DC battery 3406, through DPDT relay 3422, and through DPDT relay 3428 to Terminal A 3430 of traversing motor 3432 and also when DTDT relay 3428 is actuated, a positive electric current will flow from the positive terminal 3404 of the 24 volt DC battery 3406, through DPDT relay 3428 to Terminal B 3436 of traversing motor 3432, thus providing electric current to traversing motor 3432 in a polarity that will traverse in a backward direction the line coupled to the traversing motor 3432, thereupon lowering the seat or hammock 3212.

Please note the safety feature in the serial wiring of DTDT relay 3422 and DPDT relay 3428. The safety feature lies in that positive electric current will flow from the positive terminal 3404 of the 24 volt DC battery 3406, through DPDT relay 3428, and through DPDT relay 3422 to Terminal A 3430 of traversing motor 3432 when DPDT relay 3428 is not actuated. Positive electric current will not flow from the positive terminal 3404 of the 24 volt DC battery 3406, through DPDT relay 3428, and through DPDT relay 3422 to Terminal A 3430 of traversing motor 3432 when DPDT relay 3428 is actuated. Therefore, if somehow both DPDT relay 3422 and DPDT relay 3428 are simultaneously actuated, no current will flow to the traversing motor 3432, thus preventing both positive electric current and negative electric from simultaneously flowing to Terminal A 3430 of traversing motor 3432 and preventing both positive electric current and negative electric from simultaneously flowing to Terminal B 3436 of traversing motor 3432.

A DPDT relay consists of two separate switches that operate at the same time, each one with normally open and normally closed contact through a common connector. Each of the two contacts on the switch can be routed in different ways, depending on the position of the switch. An example of a switch is a mini-toggle switch or a switch using a push or pull control.

DPDT relay switches commonly use polarity reversal. That is why some variations of the DPDT relay, such as the cross-over switches, are internally wired for that purpose. The cross-over switches have only four terminals or connections, as opposed to six on a DPDT relay. Two connections are used for the outputs and the other two for the inputs. The switch then selects either normal or reversed polarity when connected to any direct current source such as a battery.

A DPDT relay has a single coil with two arms that move simultaneously. Inside of the DPDT relay, there are two separate single-pole-double-throw (SPDT) switch mechanisms.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 3102.

Communication media typically implements computer-readable instructions, data structures, program modules or other data; and includes any information delivery media.

By way of example, and not limitation, communication media include wired media, such as wired network or direct-wired connections, and wireless media, such as acoustic, RF, infrared and other wireless media. The scope of the term computer-readable media includes combinations of any of the above.

Apparatus components of FIG. 1-7 can be implemented as computer hardware circuitry or as a computer-readable program, or a combination of both. In another implementation, system in FIG. 1 and FIG. 2 are implemented in an application service provider (ASP) system.

The terminology used herein is for the purpose of describing particular implementations only and is not intended to limit the inventions. As used herein, the singular forms "a", "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited in the form disclosed. Many modifications and variations will be apparent to those of ordinary skill in the art without departing from the scope and spirit of the inventions. Implementations are chosen and described in order to best explain the principles and the practical application, and to enable others of ordinary skill in the art to understand various implementations with various modifications as are suited to the particular use contemplated.

In the above detailed description, reference is made to the accompanying drawings that form a part hereof, and in which is shown by way of illustration specific implementations which may be practiced. These implementations are described in sufficient detail to enable those skilled in the art to practice the implementations, and other implementations may be utilized and that logical, mechanical, electrical and other changes may be made without departing from the scope of the implementations. The following detailed description is, therefore, not to be taken in a limiting sense.

As will be appreciated by one skilled in the art, the present inventions may be implemented as a system, method or computer program product. Accordingly, the some of the present inventions may take the form of an entirely hardware implementation, an entirely software implementation (including firmware, resident software, micro-code, etc.) or an implementation combining software and hardware aspects that may all generally be referred to herein as a "circuit" "module" or "system". Furthermore, the present inventions may take the form of a computer program product implemented in any tangible medium of expression having computer-usable program code implemented in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to wireless, wireline, optical fiber cable, RF, etc.

In computer-readable program implementations, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer environment 3100 in FIG. 31, or on at least as many computers as there are components.

Computer program code for carrying out operations of the present inventions may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present inventions are described above with reference to flowchart illustrations and/or block diagrams of methods, apparatus (systems) and computer program products according to implementations. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Some implementations include a computer program product that includes a computer-usable medium having computer-usable program code implemented therewith, the computer-usable program code including computer-usable program code configured to perform specific functions. Some implementations include a field-programmable gate array that is operable to perform specific functions. Some implementations include a computer-accessible medium having executable instructions capable of directing a processor to perform specific functions. Some implementations include a computer-usable medium including a program to control an automatic door, the program comprising computer program code to perform specific functions. Some method implementations include representing a specific original physical reality with specific original data, electronically transforming the specific original data into specific transformed data using a novel and nonobvious process, and representing the specific transformed data as a specific transformed physical reality in the form of a visual depiction.

CONCLUSION

An omni-input autonomous voice controlled door opening and locking system is described. A technical effect of the system is filtering and/or suppression of background noise of audio command input. A technical effect of the system is electrical control of an automatic door in reference to commands received from voice input. Although specific implementations are illustrated and described herein, it will be appreciated by those of ordinary skill in the art that any arrangement which is calculated to achieve the same purpose may be substituted for the specific implementations shown. This application is intended to cover any adaptations or variations. One of ordinary skill in the art will appreciate that implementations can be made in software implementation or any other hardware implementation that provides the required function.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future automatic doors and different command input devices.

The terminology used in this application meant to include all automatic doors, and voice recognition systems and alternate technologies which provide the same functionality as described herein.

The invention claimed is:

1. A method comprising:
receiving a command to open a door;
responsive to the receiving, initiating an obstacle detection process;
initiating opening of the door;
performing the obstacle detection process while the door is opening;
responsive to an obstacle being detected, evaluating an obstacle warning parameter;
if the obstacle warning parameter is set to NO, halting the door opening;
if the obstacle warning parameter is set to YES; initializing a warning counter to the maximum number of iterations of a warning; and
responsive to the initialization of the warning counter, performing a loop the maximum number of iterations indicated by the warning counter; the loop comprising providing an obstacle warning, and polling for a response and if no response to the obstacle warning is received, performing a predetermined default action, and if a response to the obstacle warning is received, performing a door command in accordance with the response.

2. The method of claim 1, wherein the loop further comprises:
responsive to the warning counter being initialized, decrement the warning counter by 1;
providing the obstacle warning;
starting a timer;
responsive to a response to the obstacle warning being received within a time limit of the timer, performing the door command in accordance with the response and terminating the loop;
responsive to the response to the obstacle warning not being received within the time limit of the timer, evaluating the warning counter in comparison to zero;
responsive to the warning counter being zero, performing a predetermined default action and terminating the loop;
responsive to the warning counter being not zero, reentering the loop.

3. The method of claim 1, wherein performing the door command in accordance with the response further comprises:
evaluating the response for an indication of authority; and
performing the response in accordance with the indication of the authority.

4. The method of claim 1 further comprising:
providing the response from speech recognition.

5. The method of claim 1 further comprising:
receiving a signal of the response from a hand held controller.

6. The method of claim 1 wherein the obstacle warning further comprises:
audio enunciation of "An obstacle has been detected. Do you want to Stop, Open or Close the door?".

7. The method of claim 1 wherein the response further comprises:
"stop" "open" and "close".

8. A method comprising:
receiving a command to close a door;
responsive to the receiving, initiating an obstacle detection process;
initiating closing of the door;
performing the obstacle detection process while the door is closing;
responsive to an obstacle being detected, evaluating an obstacle warning parameter;
if the obstacle warning parameter is set to NO, halting the door closing;
if the obstacle warning parameter is set to YES; initializing a warning counter to the maximum number of iterations of a warning; and
responsive to the initialization of the warning counter, performing a loop the maximum number of iterations indicated by the warning counter; the loop comprising providing an obstacle warning, and polling for a response and if no response to the obstacle warning is received, performing a predetermined default action, and if a response to the obstacle warning is received, performing a door command in accordance with the response.

9. The method of claim 8, wherein the loop further comprises:
responsive to the warning counter being initialized, decrement the warning counter by 1;
providing the obstacle warning;
starting a timer;
responsive to a response to the obstacle warning being received within a time limit of the timer, performing the door command in accordance with the response and terminating the loop;
responsive to the response to the obstacle warning not being received within the time limit of the timer, evaluating the warning counter in comparison to zero;
responsive to the warning counter being zero, performing a predetermined default action and terminating the loop;
responsive to the warning counter being not zero, reentering the loop.

10. The method of claim 8, wherein performing the door command in accordance with the response further comprises:
evaluating the response for an indication of authority; and
performing the response in accordance with the indication of the authority.

11. The method of claim 8 further comprising:
providing the response from speech recognition.

12. The method of claim 8 wherein the obstacle warning further comprises:
audio enunciation of "An obstacle has been detected. Do you want to Stop, Open or Close the door?".

13. The method of claim 8 wherein the response further comprises:
"stop" "open" and "close".

14. A method comprising:
detecting a presence of a person on the exterior side of an exterior door;
if a door-opening-query parameter is determined to be set to true then announcing an door-opening-query;
if a response is not detected after a specified period of time then repeating the announcing; and
if a response to the door-opening-query is received within the specified period of time, then performing a door command in accordance with the response.

15. The method of claim 14 further comprising:
if a response is not detected after another specified period of time, then performing a default action.

16. The method of claim 14 further comprising:
providing the response from speech recognition.

17. The method of claim 14 further comprising:
receiving a signal of the response from a hand held controller.

18. The method of claim 14 wherein the door-opening-query further comprises:
audio enunciation of "A person is at the front door. Do you want to open the door?".

19. The method of claim 14 wherein the response further comprises:
"YES", "OPEN", or "NO".

20. The method of claim 14 wherein the door command further comprises:
"lock" "unlock" "close" "open" "activate" and "help".

* * * * *